(12) United States Patent
Araki et al.

(10) Patent No.: US 12,019,813 B2
(45) Date of Patent: Jun. 25, 2024

(54) INPUT DEVICE AND INPUT SYSTEM

(71) Applicant: Panasonic Intellectual Property Management Co., Ltd., Osaka (JP)

(72) Inventors: Kota Araki, Osaka (JP); Hiroaki Nishiono, Osaka (JP); Sohui Jeon, Osaka (JP); Takumi Nishimoto, Okayama (JP); Yukio Hashimoto, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/916,951

(22) PCT Filed: Jan. 29, 2021

(86) PCT No.: PCT/JP2021/003159
§ 371 (c)(1),
(2) Date: Oct. 4, 2022

(87) PCT Pub. No.: WO2021/210240
PCT Pub. Date: Oct. 21, 2021

(65) Prior Publication Data
US 2023/0305648 A1    Sep. 28, 2023

(30) Foreign Application Priority Data

Apr. 16, 2020 (JP) ................. 2020-073692

(51) Int. Cl.
*G06F 3/0362* (2013.01)
*H01H 19/08* (2006.01)

(52) U.S. Cl.
CPC .......... *G06F 3/0362* (2013.01); *H01H 19/08* (2013.01); *H01H 2205/002* (2013.01)

(58) Field of Classification Search
CPC . G06F 3/0362; H01H 19/08; H01H 2205/002
See application file for complete search history.

(56) References Cited

U.S. PATENT DOCUMENTS

| 10,705,629 B1 * | 7/2020 | Arnold ................ G06F 3/03547 |
| 10,921,913 B1 * | 2/2021 | Fong ................... G06F 3/04162 |

(Continued)

FOREIGN PATENT DOCUMENTS

| JP | 2003-131800 A | 5/2003 |
| JP | 2013-191058 A | 9/2013 |

(Continued)

OTHER PUBLICATIONS

International Search Report dated Apr. 20, 2021 issued in International Patent Application No. PCT/JP2021/003159, with English translation.

*Primary Examiner* — Ibrahim A Khan
(74) *Attorney, Agent, or Firm* — Rimon P.C.

(57) ABSTRACT

An input device includes two fixed electrodes and an operating member. The two fixed electrodes is configured to be placed to overlap with specific line electrodes of a plurality of line electrodes. The operating member is movable with respect to the two fixed electrodes. The operating member is movable within a movable range including a plurality of click points. Electrical states of the two fixed electrodes change among a plurality of states in accordance with a movement of the operating member. A divisor of an integer N does not include 4, where the integer N is a total number of times of change in the electrical states of the at least two fixed electrodes when the operating member moves from one to a next one of adjacent two click points of the plurality of click points.

14 Claims, 15 Drawing Sheets

(56) References Cited

U.S. PATENT DOCUMENTS

| | | | |
|---|---|---|---|
| 2013/0241579 A1 | 9/2013 | Takahashi | |
| 2016/0077630 A1* | 3/2016 | Inai | G03B 17/02 345/174 |
| 2016/0315613 A1* | 10/2016 | Ito | H01H 19/11 |
| 2017/0316901 A1* | 11/2017 | Sawada | H01H 19/02 |
| 2018/0046267 A1* | 2/2018 | Kobayashi | G06F 3/03 |
| 2018/0164902 A1* | 6/2018 | Spevak | G06F 3/0362 |
| 2018/0217190 A1* | 8/2018 | Spevak | G06F 3/0202 |
| 2019/0080864 A1 | 3/2019 | Sawada et al. | |
| 2021/0048846 A1* | 2/2021 | Hinson | G06F 3/0362 |
| 2021/0055806 A1* | 2/2021 | Shepelev | B60K 35/10 |
| 2021/0223907 A1* | 7/2021 | Hoch | G06F 3/0443 |
| 2021/0232260 A1* | 7/2021 | Fong | G06F 3/0446 |
| 2021/0232269 A1* | 7/2021 | Sasaki | G06F 3/0446 |
| 2022/0374084 A1* | 11/2022 | Orita | G06F 3/0383 |
| 2022/0404912 A1* | 12/2022 | Orita | G06F 3/0445 |
| 2023/0004224 A1* | 1/2023 | Orita | G06F 3/0362 |
| 2023/0004225 A1* | 1/2023 | Orita | G06F 3/0488 |

FOREIGN PATENT DOCUMENTS

| | | |
|---|---|---|
| JP | 2015-159100 A | 9/2015 |
| JP | 2016-001544 A | 1/2016 |
| JP | 6627085 B2 | 12/2019 |
| WO | 2016/002202 A1 | 1/2016 |

\* cited by examiner

Q1:L Q2:H

Q1:L Q2:L

Q1:H Q2:L

Q1:H Q2:H

INPUT DEVICE AND INPUT SYSTEM

CROSS-REFERENCE OF RELATED APPLICATIONS

This application is the U.S. National Phase under 35 U.S.C. § 371 of International Patent Application No. PCT/JP2021/003159, filed on Jan. 29, 2021, which in turn claims the benefit of Japanese Patent Application No. 2020-073692, filed on Apr. 16, 2020, the entire disclosures of which Applications are incorporated by reference herein.

TECHNICAL FIELD

The present disclosure relates to input devices and input systems. The present disclosure relates particularly to an input device to be placed on a specific line electrode of a plurality of line electrodes and an input system including the input device.

BACKGROUND ART

Patent Literature 1 discloses an input device including a sensor electrode (line electrode), two electrodes (fixed electrodes), and a rotary operating knob (operating member). The two electrodes are placed to be apart from and to face the sensor electrode. The rotary operating knob is made of metal, and functions as a ground electrode. The rotary operating knob is rotatable with respect to the two electrodes. The rotary operating knob rotates and is electrically connected to or separated from the two electrodes individually, and thereby the rotary operating knob changes electrical states between the sensor electrode and the two electrodes.

The input device described above is configured to be subject to calibration on an output voltage of the sensor electrode (i.e., setting on a reference value of the sensor electrode) when the rotary operating knob is located at a click point. When the calibration is performed, the two electrodes should be surely electrically separated from the ground electrode so that the sensor electrode can correctly detect an electrode that faces the sensor electrode. Therefore, the input device should be constructed such that the two electrodes are surely electrically separated from the ground electrode at all click points. To realize this, this input system is configured such that electrical states of the two electrodes change total four times when the rotary operating knob moves from one click point to a next click point.

CITATION LIST

Patent Literature

Patent Literature 1: JP 6627085 B

SUMMARY OF INVENTION

An object of the present disclosure is to provide an input device and an input system that can offer a greater degree of flexibility in the setting of a total number of times of change in electrical states of fixed electrodes when an operating member moves from one click point to a next click point.

An input device according to an aspect of the present disclosure includes at least two fixed electrodes and an operating member. The at least two fixed electrodes are configured to be placed to overlap with specific line electrodes of a plurality of line electrodes. The operating member is movable with respect to the at least two fixed electrodes. The operating member is movable within a movable range including a plurality of click points. Electrical states of the at least two fixed electrodes change among a plurality of states in accordance with a movement of the operating member. A divisor of an integer N does not include 4, where the integer N is a total number of times that the electrical states of the at least two fixed electrodes change when the operating member moves from one to a next one of adjacent two click points of the plurality of click points.

An input system according to an aspect of the present disclosure includes the input device according to the above aspect, the plurality of line electrodes, and the signal processor. The signal processor is configured to perform signal processing on an output signal output from the plurality of line electrodes.

DESCRIPTION OF EMBODIMENTS

Figure 1:
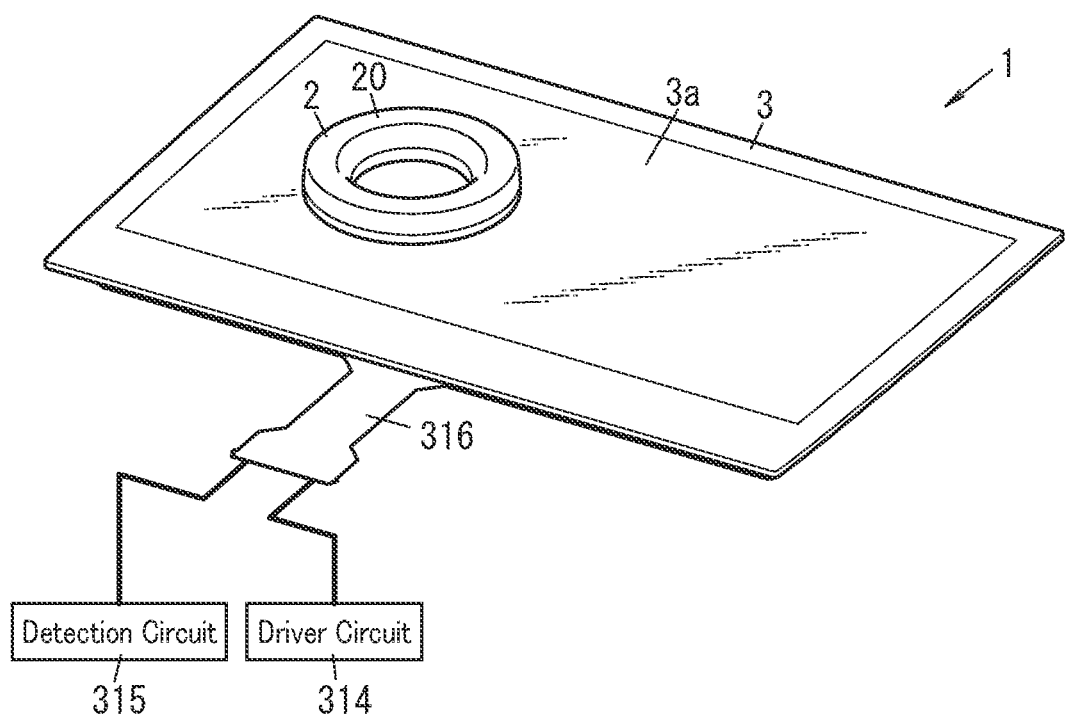
FIG. 1 is a perspective view of an input system according to an embodiment.

An input system according to an embodiment will now be described in detail with reference to the accompanying drawings. Note that the embodiment to be described below is only an exemplary one of various embodiments of the present disclosure and should not be construed as limiting. Rather, the embodiment may be readily modified in various manners depending on a design choice or any other factor as long as the advantages of the present disclosure are achievable.

Embodiment

An input system 1 according to an embodiment will be described with reference to FIGS. 1 to 5.

As shown in FIGS. 1 to 5, the input system 1 includes an input device 2, a touchscreen panel 3 (which may be referred to as "touchscreen sensor"), and a display device 4. The display device 4 may not be a constituent element of the input system 1.

The display device 4 may be, for example, a liquid crystal display or an organic electroluminescent display which may display various types of information thereon. As the display device 4, a known general-purpose display device may be used.

The touchscreen panel 3 is a device which is placed on a display screen 4a of the display device 4 to detect a point of touch by the operator onto the display screen 4a. As used herein, the "point of touch" refers to a location on the display screen 4a where the operator has put his or her finger. The touchscreen panel 3 includes a touchscreen panel body 31 and a cover panel 32 (see FIG. 2). The touchscreen panel body 31 is a member for detecting the point of touch by the operator onto the display screen 4a. The touchscreen panel body 31 is provided for the display screen 4a to cover the display screen 4a entirely. The cover panel 32 is a member which forms the front surface 3a of the touchscreen panel 3. The cover panel 32 may be made of glass, or made of a transparent resin and formed in the shape of a sheet, for example.

The input device 2 is device to accept an operation (rotary operation and push operation) performed by an operator. The input device 2 may have an annular shape, for example. The input device 2 is provided, on the front side thereof, with an operating member 20 configured to accept an operation performed by the operator (see FIG. 3). The input device 2 is provided, on the rear surface thereof, with fixed electrodes 29a to 29d (see FIG. 4). The input device 2 is placed at an arbitrary location on the front surface 3a of the touchscreen panel 3 so that the rear surface of the input device 2 faces the front surface 3a of the touchscreen panel 3 (see FIG. 1). At such a location, electrical states of the four fixed electrodes 29a to 29d will change in accordance with an operation performed on the operating member 20. These electrical states are detected by a point of touch detection function of the touchscreen panel 3, which enables detecting the operation performed on the operating member 20.

Detailed Explanation (Details of Input Device)

The input device 2 will be described with reference to FIGS. 3 to 6.

Figure 6:
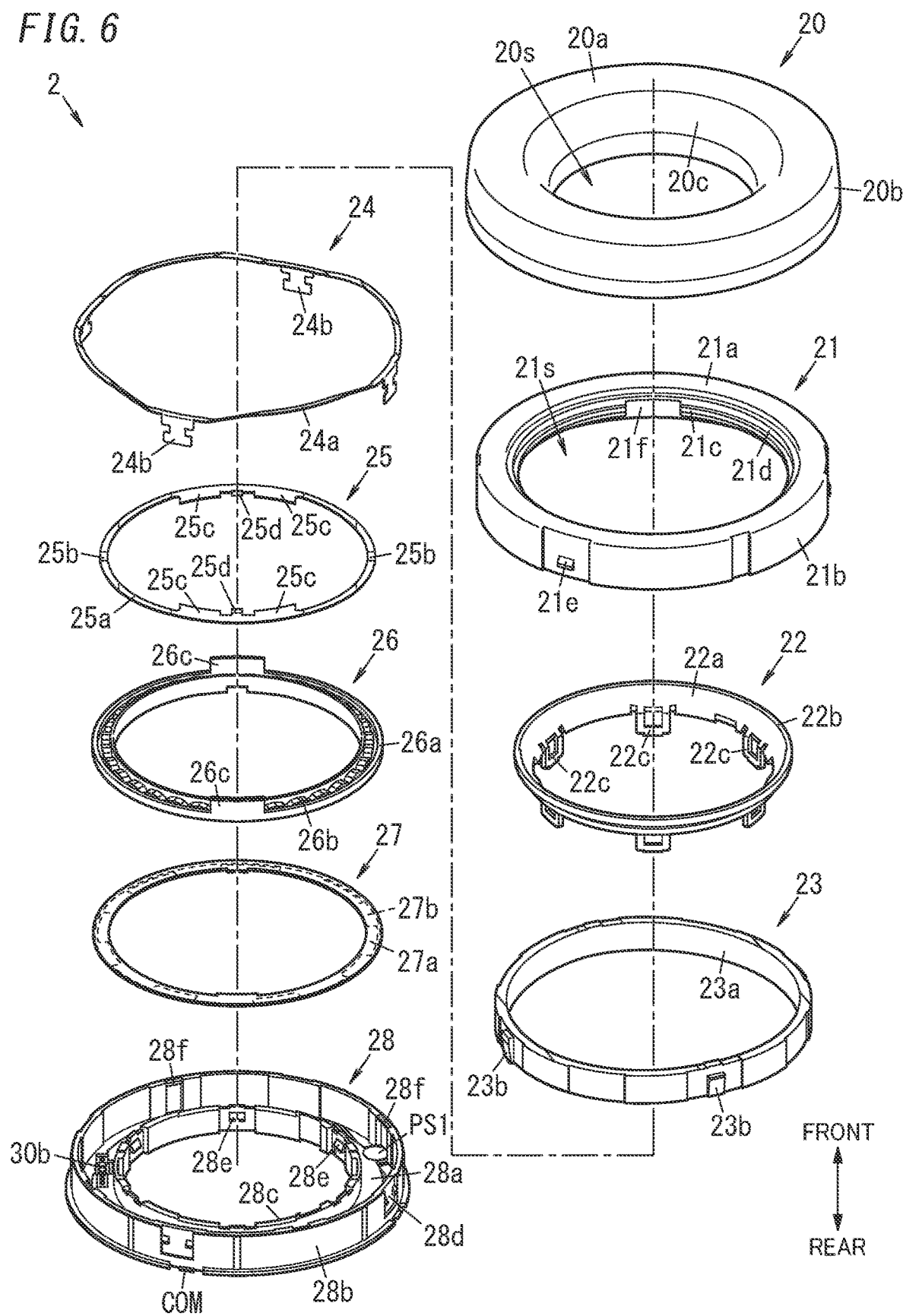
FIG. 6 is an exploded perspective view of the input device.

As shown in FIG. 6, the input device 2 includes the operating member 20, a rotary body 21, a fixing member 22, a push member 23, a return spring 24, a click spring 25, a rotary click cam 26, and a rotary contact plate 27. The input device 2 further includes a case 28, a plurality of (e.g., four) fixed electrodes 29a to 29d, a plurality of (e.g., four) contactors 30a to 30d, and a push switch PS1.

The operating member 20 is a member for accepting a rotary operation and push operation performed by the operator. The operating member 20 is rotatable with respect to the case 28 (i.e., with respect to the fixed electrodes 29a to 29d). The operating member 20 is formed in the shape of an annular box with an opening 20s in a plan view. The operating member 20 is open at the rear surface. Note that the operating member 20 may have an outer shape without the opening 20s. In that case, an inner peripheral wall portion 20c (to be described later) may or may not be provided, whichever is appropriate.

In the operating member 20, respective constituent elements (the rotary body 21, the fixing member 22, the push member 23, the return spring 24, the click spring 25, the rotary click cam 26, the rotary contact plate 27, and the case 28) are housed. The operating member 20 includes a base plate portion 20a, an outer peripheral wall portion 20b, and the inner peripheral wall portion 20c. The base plate portion 20a is a circular plate member. The outer peripheral wall portion 20b protrudes rearward from an outer peripheral edge of the base plate portion 20a. The inner peripheral wall portion 20c protrudes rearward from an inner peripheral edge of the base plate portion 20a.

The operating member 20 includes a plurality of recesses and a plurality of protrusions. The plurality of recesses are fitted to protrusions 21e (to be described later) of the rotary body 21 to circumferentially fix the position of the protrusions 21e. The plurality of recesses are provided in an inner peripheral surface of the outer peripheral wall portion 20b of the operating member 20 and arranged to be spaced apart from each other along a circumferential direction. Each of the plurality of recesses is provided in the inner peripheral surface of the outer peripheral wall portion 20b of the operating member 20 and extends along the front-back direction. The plurality of protrusions correspond one to one to the plurality of recesses, and each of the plurality of protrusions is provided on a bottom of a corresponding recess. The respective protrusions are caught together with the protrusions 21e that are fitted into the respective recesses, whereby the operating member 20 is fixed to the rotary body 21.

Figure 2:
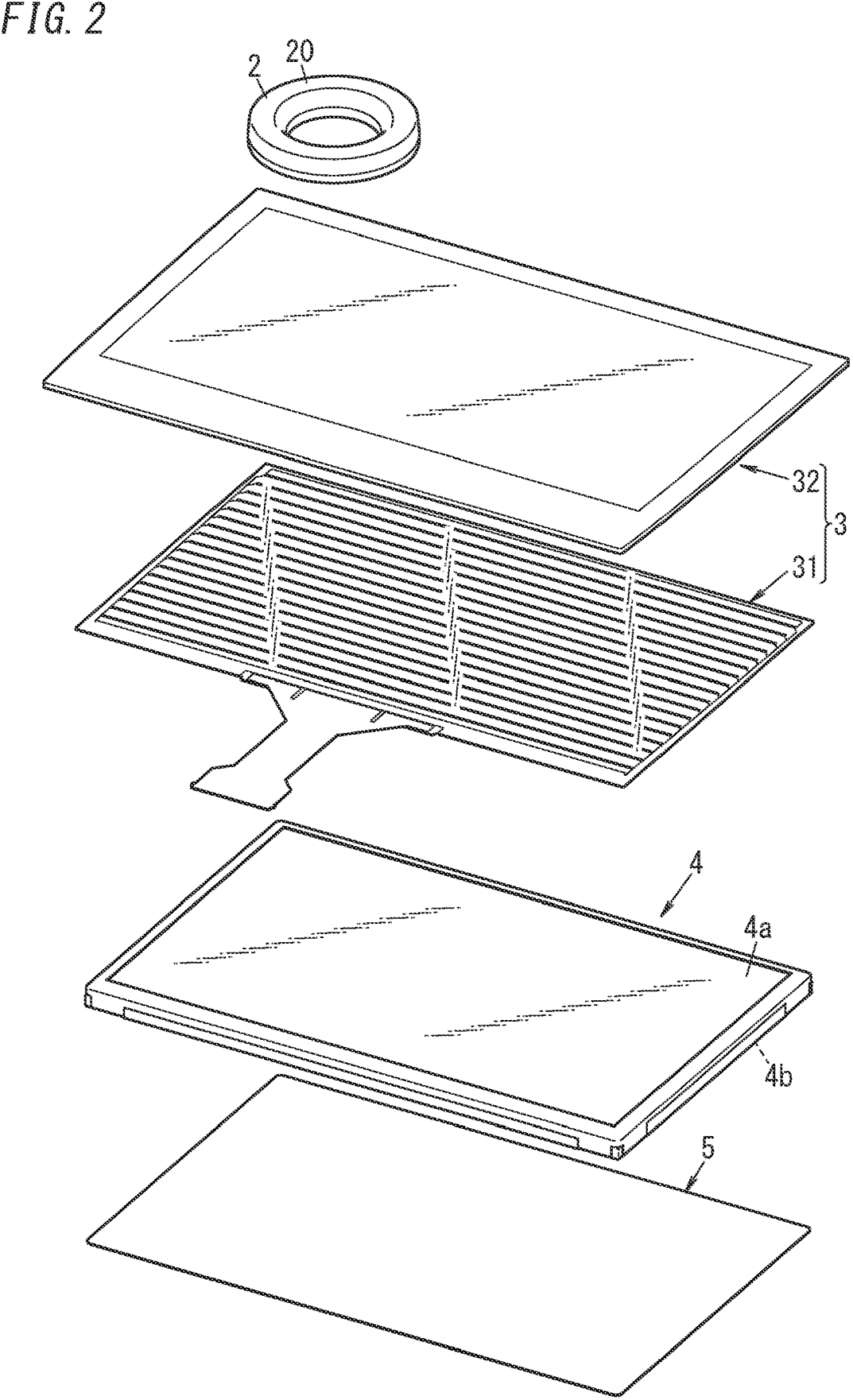
FIG. 2 is an exploded perspective view of the input system.
Figure 3:
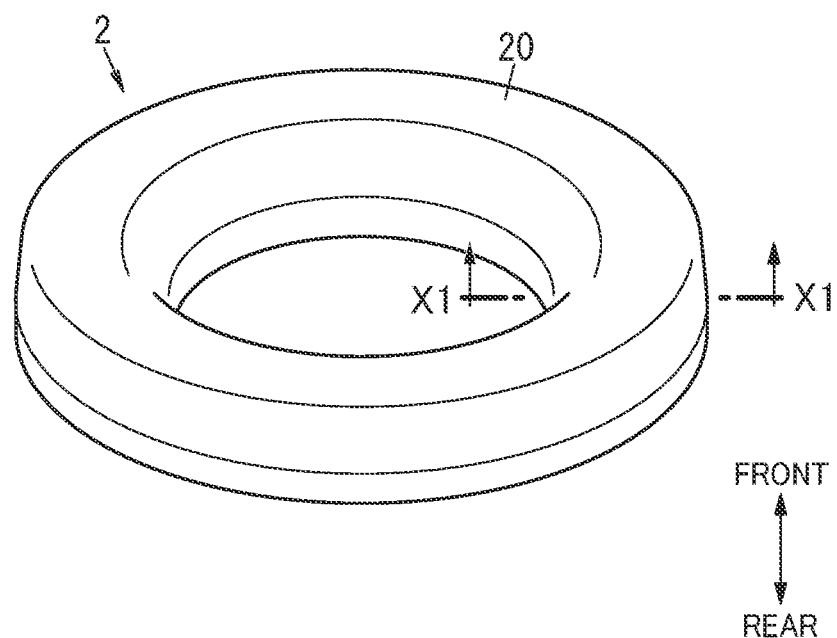
FIG. 3 is a perspective view, as viewed from an upper side, of an input device included in the input system shown in FIG. 2.

The rotary body 21 is placed to be rotatable with respect to the case 28. The rotary body 21 is coupled with the operating member 20 and rotatable along with the operating member 20. The rotary body 21 is configured to move back and forth along with a back and forth movement of the operating member 20 when the push operation is performed on the operating member 20. As shown in FIG. 2 and the like, the rotary body 21 may be formed in the shape of an annular frame with an opening 21s in a plan view, for example. The rotary body 21 includes a base plate portion 21a, an outer peripheral wall portion 21b, an inner peripheral wall portion 21c, and a flange 21d. The base plate portion 21a is a circular plate member. The outer peripheral wall portion 21b protrudes rearward from an outer peripheral edge of the base plate portion 21a. The inner peripheral wall portion 21c slightly protrudes rearward from an inner peripheral edge of the base plate portion 21a. The flange 21d protrudes from an inner peripheral surface of the inner peripheral wall portion 21c into the opening 21s. The inner peripheral wall portion 21c has a rear end surface that is a portion to press the push member 23. The flange 21d is a portion to be caught on a flange 22b of the fixing member 22. Note that the rotary body 21 may have a shape without the opening 21s. In that case, the inner peripheral wall portion 21c may or may not be provided, whichever is appropriate.

The rotary body 21 includes the plurality of protrusions 21e and a plurality of recesses 21f. The plurality of protrusions 21e are provided on an outer peripheral surface of the rotary body 21 (specifically, an outer peripheral surface of the outer peripheral wall portion 21b) and arranged to be spaced apart from each other along the circumferential direction. The plurality of protrusions 21e correspond one to one to the plurality of protrusions as well as to the plurality of recesses of the operating member 20. The plurality of protrusions 21e are fitted into the respective recesses and then caught together with the respective protrusions. The plurality of recesses 21f are portions into which fixed pieces 26c (to be described later) of the rotary click cam 26 are to be fitted. Each of the plurality of recesses 21f is provided in the inner peripheral wall portion 21c of the rotary body 21 to cutout a lower end of the inner peripheral wall portion 21c toward an upper end.

The fixing member 22 is a member to rotatably fix the rotary body 21 to the case 28. The fixing member 22 is located inside the rotary body 21 and is fixed to the case 28. As shown in FIG. 6 and the like, the fixing member 22 may be formed in the shape of an annular tube with an opening in a plan view, for example. Alternatively, the fixing member 22 may have a shape without the opening.

The fixing member 22 includes a tubular portion 22a, a flange 22b, and a plurality of catch pieces 22c. The tubular portion 22a has the shape of a short circular tube. The flange 22b protrudes outward from a front edge of the tubular portion 22a. The flange 22b is a portion to catch a front surface of the flange 21d of the rotary body 21. The flange 22b restricts the rotary body 21 from moving forward. The flange 22b serves as an operation fulcrum of the rotary body 21 when the push operation is performed. The plurality of catch pieces 22c are portions to catch protrusions 28e (to be described later) of the case 28. The plurality of catch pieces 22c are provided at a rear end of the tubular portion 22a to protrude rearward and arranged to be spaced apart from each other along the circumferential direction. The catch piece 22c is provided with a catch hole to which the protrusion 28e (to be described later) of the case 28 is to be caught.

The push member 23 is a member configured to be moved back and forth, via the rotary body 21, according to the back and forth movement of the operating member 20 to push the push switch PS1 (to be described later) located inside the case 28. The push member 23 is placed on the rear of the rotary body 21 and inside the case 28 so as not to be rotatable with respect to the case 28. The push member 23 has the shape of a short circular tube. The push member 23 includes a push member body 23a and a plurality of protrusions 23b. The push member body 23a has the shape of a short circular tube. The plurality of protrusions 23b are fitted into recesses 28f (to be described later) of the case 28 to circumferentially fix the position of the push member 23 with respect to the case 28. The plurality of protrusions 23b are provided on an outer peripheral surface of the push member body 23a and arranged to be spaced apart from each other along the circumferential direction.

The return spring 24 is a member to bias the operating member 20 forward. The return spring 24 is an elastic thin plate member made of metal. The return spring 24 includes a spring body 24a and a plurality of fixed pieces 24b. The spring body 24a is an annular plate member, and curves back and forth along the circumferential direction. The plurality of fixed pieces 24b are portions to be fixed to the case 28. The plurality of fixed pieces 24b are provided on an outer peripheral edge of the spring body 24a to protrude rearward and arranged to be spaced apart from each other along the circumferential direction. The return spring 24 is disposed between the rotary body 21 and a front end of an outer peripheral wall (to be described later) of the case 28. At such a location, the fixed pieces 24b of the return spring 24 are fixed to an outer peripheral surface of an outer peripheral wall portion 28b (to be described later) of the case 28. The return spring 24 biases the rotary body 21 forward to bias the operating member 20 forward.

The click spring 25 is a member cooperating with the rotary click cam 26 to provide a click feeling to the operator performing the rotary operation. The click spring 25 is in contact with an uneven portion 26b (to be described later) on a front surface of the rotary click cam 26 and is fixed to the case 28. The click spring 25 is an elastic annular thin plate member made of metal. The click spring 25 includes a spring body 25a, two protrusions 25b, four fixed pieces 25c, and two protruding pieces 25d. The spring body 25a is an annular thin plate member. The two protrusions 25b are provided in the spring body 25a to be spaced apart from each other along the circumferential direction, and each be convex from the front surface side to the rear surface side to have an arc-shaped profile. The four fixed pieces 25c are parts to be sandwiched and fixed between a rear end of the tubular portion 22a of the fixing member 22 and a front end of an inner peripheral wall portion 28c (to be described later) of the case 28. The four fixed pieces 25c are provided on an inner peripheral edge of the spring body 25a to protrude inward and arranged to be spaced apart from each other along the circumferential direction. The two protruding pieces 25d are parts to catch the catch holes of the catch pieces 22c the fixing member 22. The protruding pieces 25d catch the catch holes of the catch pieces 22c to circumferentially fix the position of the click spring 25 with respect to the fixing member 22.

The rotary click cam 26 is a member cooperating with the click spring 25 to provide the click feeling to the operator who performs the rotary operation. The rotary click cam 26 is placed on the back of the click spring 25 to be in contact with the protrusions 25b of the click spring 25, and is rotatably disposed inside the case 28. The rotary click cam 26 may be made of synthetic resin, for example. The rotary click cam 26 is an annular plate member. The rotary click cam 26 includes a rotary click cam body 26a, the uneven portion 26b, and the two fixed pieces 26c. The rotary click cam body 26a is an annular plate member with a center hole 26s. The uneven portion 26b is provided on the front surface of the rotary click cam body 26a along the entire circumference of the rotary click cam body 26a. The uneven portion 26b includes a plurality of protrusions and a plurality of recesses arranged alternatively. Bringing the protrusions 25b of the click spring 25 into elastic contact with the uneven portion 26b gives the operator the click feeling every time the protrusion 25b climbs over the protrusions of the uneven portion 26b while the rotary click cam 26 rotates. The two fixed pieces 26c are provided on an outer peripheral edge of the rotary click cam body 26a to protrude forward and arranged to be spaced apart from each other along the circumferential direction. Fitting the fixed pieces 26c into the respective recesses 21f of the rotary body 21 allows the rotary click cam 26 to rotate along with the rotary body 21.

Figure 7:
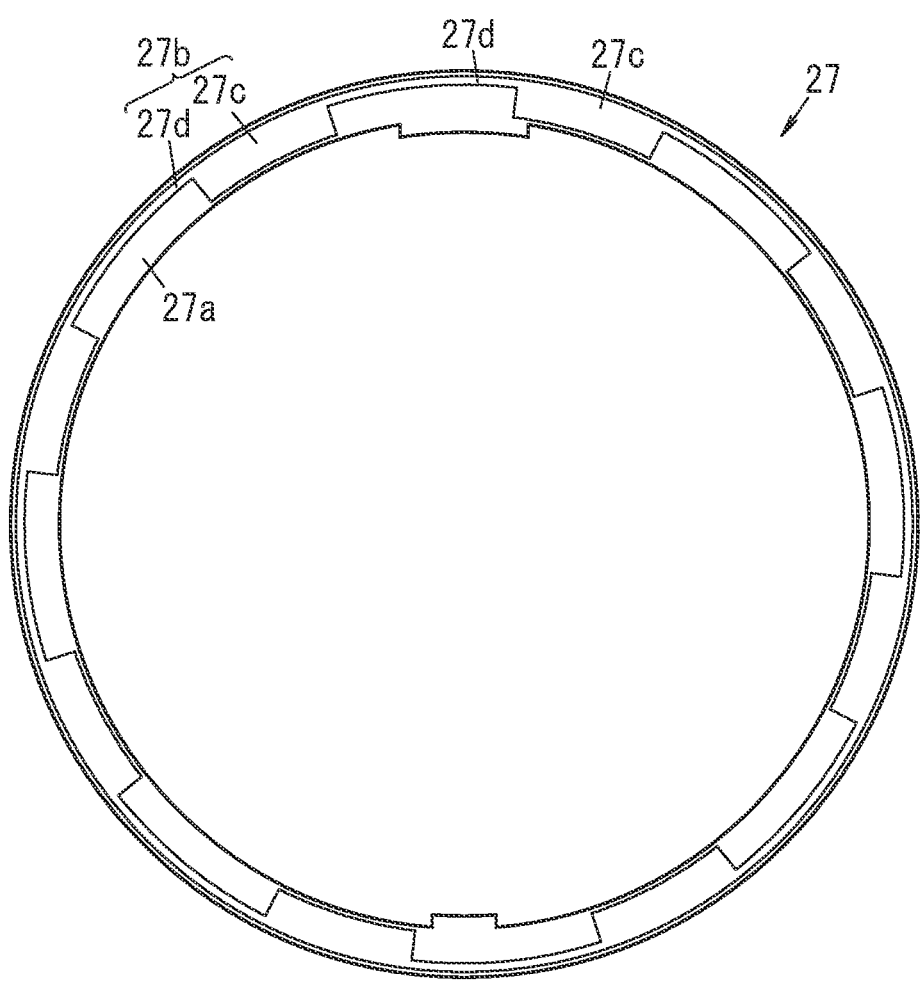
FIG. 7 is a plan view, as viewed from a rear side, of a rotary contact plate included in the input device shown in FIG. 6.

The rotary contact plate 27 is an annular plate member. The rotary contact plate 27 includes a rotary contact plate body 27a and a movable electrode 27b (see FIG. 7). The rotary contact plate body 27a is an insulating board with electrical insulation properties, and has the shape of an annular plate with a center hole 27s. The movable electrode 27b is provided on the rear surface of the rotary contact plate body 27a. The movable electrode 27b includes a plurality of electrode portions 27c and a plurality of wiring portions 27d. The plurality of electrode portions 27c are portions with which the contactors 30a to 30d are to come in contact, and each may have a rectangular shape, for example. The plurality of electrode portions 27c are provided on the rear surface of the rotary contact plate body 27a and arranged to be spaced apart from each other along the circumferential direction. The wiring portions 27d are portions electrically connecting the electrode portions 27c. The rest area (insulation board) of the rear surface, other than the region on which the movable electrode 27b is provide, of the rotary contact plate body 27a is an insulating area. The front surface of the rotary contact plate body 27a is fixed to the rear surface of the rotary click cam 26, such that the rotary contact plate 27 rotates along with the rotary click cam 26. Therefore, the movable electrode 27b rotates (moves) along with the rotary click cam 26. The contactors 30a to 30d are in elastic contact with the rear surface of the rotary contact plate body 27a.

Figure 4:
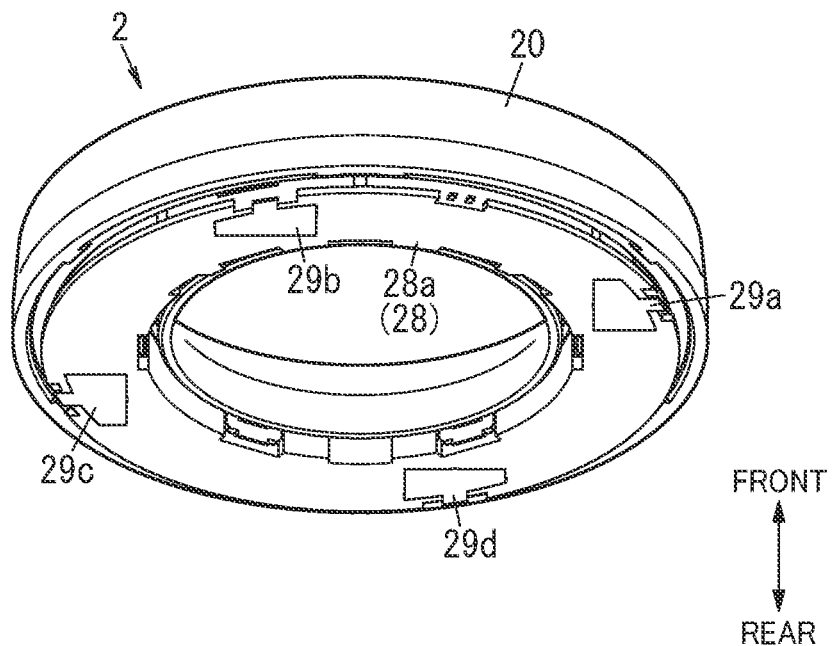
FIG. 4 is a perspective view of the input device as viewed from a lower side.
Figure 8:
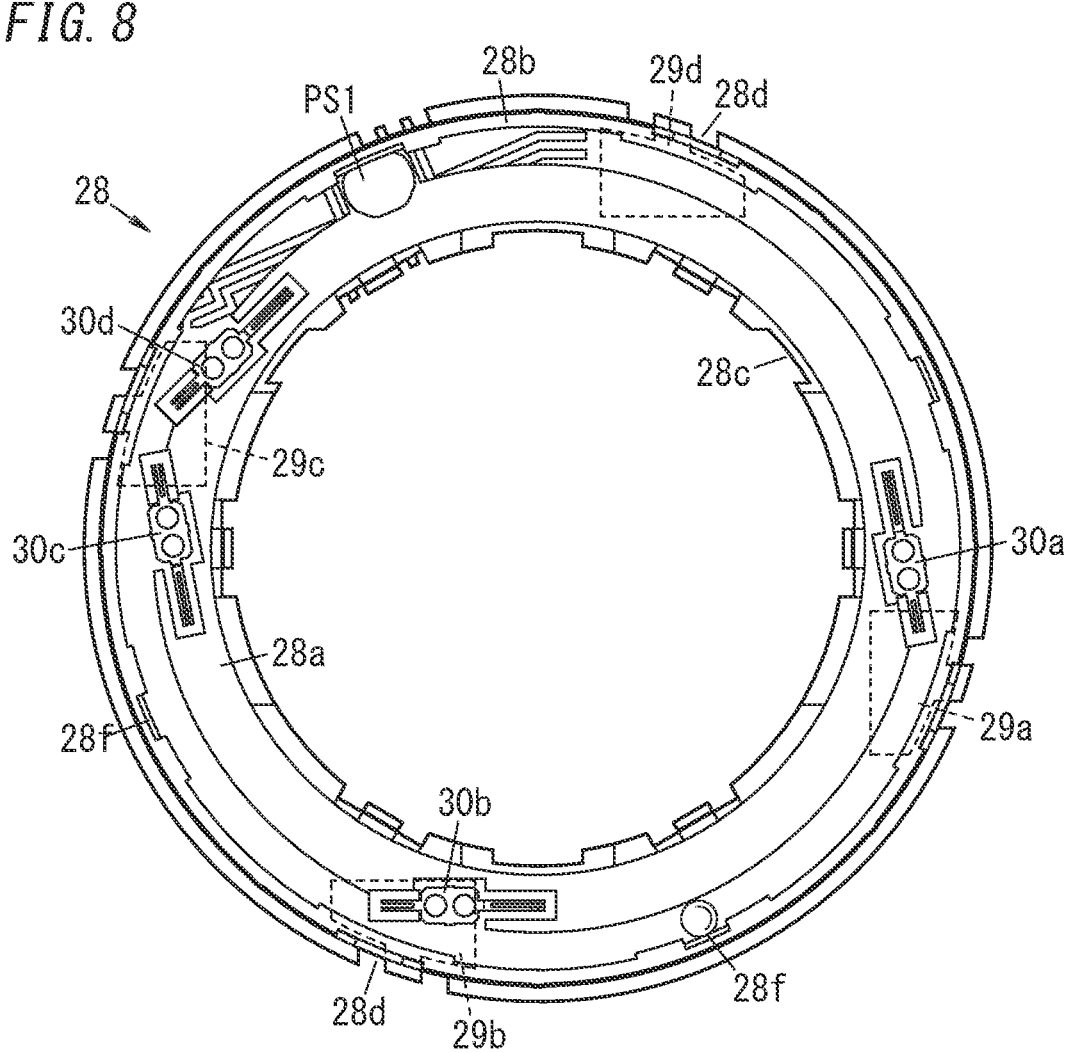
FIG. 8 is a plan view, as viewed from a front side, of a case included in the input device shown in FIG. 6.

The respective constituent elements (the operating member 20, the rotary body 21, the fixing member 22, the push member 23, the return spring 24, the click spring 25, the rotary click cam 26, the rotary contact plate 27, the fixed electrodes 29a to 29d, the four contactors 30a to 30d, and the push switch PS1) are mounted on the case 28 (see FIGS. 4 and 8). The four fixed electrodes 29a to 29d correspond one to one to the four contactors 30a to 30d.

The case 28 is made of resin and has the electrical insulation properties. The case 28 is formed in the shape of an annular box with a center hole 28s and opened front surface in a plan view. The case 28 includes a bottom portion 28a, the outer peripheral wall portion 28b, and the inner peripheral wall portion 28c. The bottom portion 28a may be a circular plate member, for example. The outer peripheral wall portion 28b protrudes forward from an outer peripheral edge of the bottom portion 28a. The inner peripheral wall portion 28c protrudes forward from an inner peripheral edge of the bottom portion 28a.

The case 28 includes a plurality of (e.g., two) recesses 28d, a plurality of (e.g., four) protrusions 28e, and a plurality of (e.g., four) recesses 28f. The plurality of recesses 28d are portions to which the fixed pieces 24b of the return spring 24 are fitted and fixed. The plurality of recesses 28d are provided in an outer peripheral surface of the outer peripheral wall portion 28b and arranged to be spaced apart from each other along the circumferential direction. The plurality of protrusions 28e are portions to be caught together with the plurality of catch pieces 22c of the fixing member 22. The four protrusions 28e are provided on an inner peripheral surface of the inner peripheral wall portion 28c and arranged to be spaced apart from each other along the circumferential direction. The plurality of recesses 28f are portions to which the plurality of protrusions 23b of the push member 23 are fitted so that the push member 23 can move along the front-back direction but cannot move along the circumferential direction. The plurality of recesses 28f are provided in the inner peripheral surface of the outer peripheral wall portion 28b and arranged to be spaced apart from each other along the circumferential direction. Each of plurality of recesses 28f extends along the front-back direction.

On a rear surface of the bottom portion 28a, the four fixed electrodes 29a to 29d are provided (see FIG. 4). The fixed electrodes 29a to 29d are electrodes to overlap with first line electrodes X1 and second line electrodes Y1 (to be described later) of the touchscreen panel 3 while the input device 2 is placed on the front surface 3a of the touchscreen panel 3. Each of the fixed electrodes 29a to 29d has the substantially rectangular shape. The fixed electrodes 29a to 29d are provided on the rear surface of the case 28 and arranged to be spaced apart from each other (e.g., at regular intervals) along the circumferential direction.

To a front surface of the bottom portion 28a, the four contactors 30a to 30d and the push switch PS1 are fixed (see FIG. 8). Each of the contactors 30a to 30d is a member to come in elastic contact with the rear surface of the rotary contact plate 27 (and to be electrically connected to the movable electrode 27b). The contactors 30a to 30d include contacts S1 to S4, respectively, that are configured to come in contact with the rotary contact plate 27. Each of the contactors 30a to 30d is electrically connected with a corresponding one of the fixed electrodes 29a to 29c via a wiring provided on the front surface of the bottom portion 28a. In the embodiment, the contactor 30a is connected with the fixed electrode 29a, the contactor 30b is connected with the fixed electrode 29b, and the contactors 30c and 30d are connected with the fixed electrode 29c, respectively. The push switch PS1 is a push-button type switch of which ON state and OFF state are switched according to the push operation performed on the operating member 20. According to the ON state and the OFF state of the push switch PS1, the fixed electrode 29d and the fixed electrode 29c are electrically connected to or separated from each other. The push switch PS1 is provided at a predetermined position of the bottom portion 28a.

Hereinafter, the fixed electrode 29c may be referred to as a "common electrode 29c" if necessary.

Figure 5:
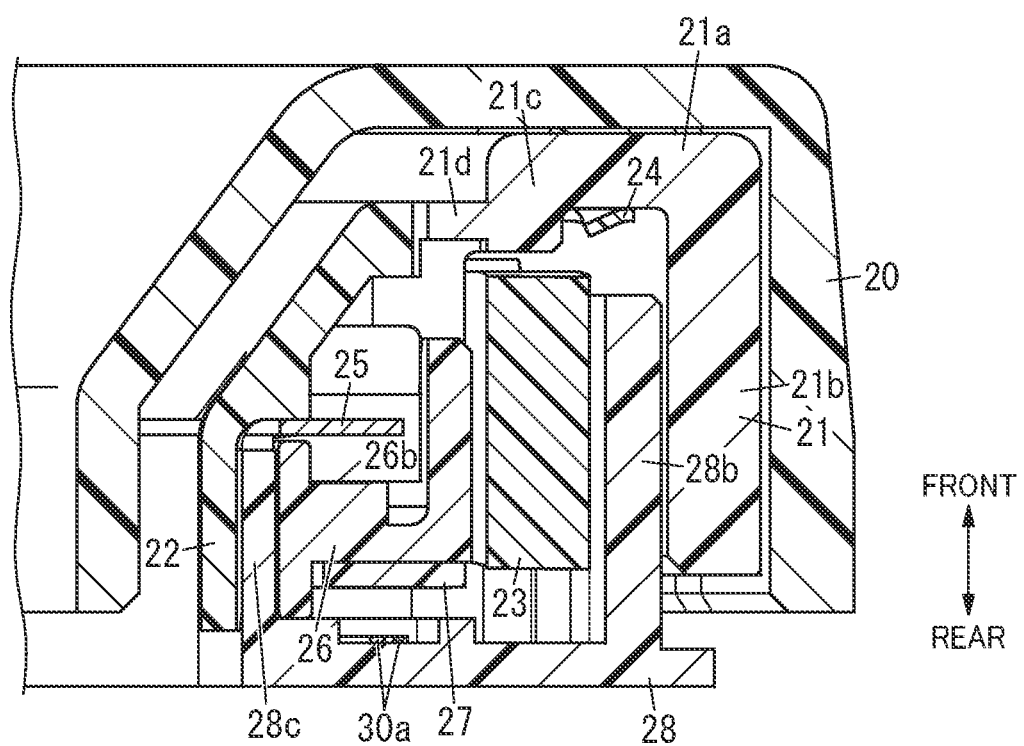
FIG. 5 is a cross-sectional view of the input device taken along a line X1-X1 shown in FIG. 3.

As shown in FIG. 5, the rotary body 21, the fixing member 22, the push member 23, the return spring 24, the click spring 25, and the rotary click cam 26 are attached to the case 28.

The catch pieces 22c of the fixing member 22 are hooked together on the protrusions 28e of the case 28, whereby the fixing member 22 is fixed on the front side of the inner peripheral wall portion 28c of the case 28. Inside the case 28, the rotary click cam 26 is located adjacent to an outer side of the inner peripheral wall portion 28c so that the rotary click cam 26 is rotatable. At such a location, the rotary contact plate 27 provided on the rear surface of the rotary click cam 26 is in elastic contact with the four contactors 30a to 30d provided on the bottom portion 28a of the case 28. The fixed pieces 25c of the click spring 25 is sandwiched between the rear end of the tubular portion 22a of the fixing member 22 and the front end of the inner peripheral wall portion 28c of the case 28, whereby the click spring 25 is fixed at a position in front of the rotary click cam 26. The protruding pieces 25d of the click spring 25 are caught in the catch holes of the catch pieces 22c of the fixing member 22. This restricts the circumferential movement of the click spring 25. The protrusions 25b of the click spring 25 are in elastic contact with the uneven portion 26b of the rotary click cam 26. Inside the case 28, the push member 23 is located adjacent to an outer side of the outer peripheral wall portion 28b. Moreover, the protrusions 23b of the push member 23 are fitted into the recesses 28f of the outer peripheral wall portion 28b. Accordingly, the push member 23 is movable along the front-back direction but is not movable along the circumferential direction. The push switch PS1 is located on the rear side of the push member 23.

The rotary body 21 is placed on the case 28 to cover an outer side of the case 28. The outer peripheral wall portion 28b of the case 28 and the push member 23 are located inside the rotary body 21. At such a location, the flange 21d of the rotary body 21 is located on the rear side of the flange 22b of the fixing member 22. This can restrict the forward movement of the rotary body 21 (and can prevent the falling out of the rotary body 21 from the case 28). The fixed pieces 26c of the rotary click cam 26 are fitted into the recesses 21f of the rotary body 21 (see FIG. 6), respectively, so that the rotary click cam 26 is rotatable along with the rotary body 21. The return spring 24 is located between the front end of the outer peripheral wall portion 28b of the case 28 and the rotary body 21 to bias the rotary body 21 forward. The fixed pieces 24b of the return spring 24 is fitted into the recesses 28d of the case 28, respectively (see FIG. 6), whereby the return spring 24 is fixed to the front end of the outer peripheral wall portion 28b. The operating member 20 is attached to the case 28 to cover the fixing member 22 and the rotary body 21. At such a location, the protrusions 21e of the rotary body 21 are fitted into the recesses of the operating member 20 and caught together with the protrusions of the operating member 20. As a result, the operating member 20 is fixed to the rotary body 21 to be rotatable along with the rotary body 21. The operating member 20 is attached to the case 28 via the rotary body 21.

In this input device 2, the fixing member 22 and the click spring 25 are fixed to the case 28. The push member 23 is located inside the case 28 to be movable back and forth according to the back and forth movement of the rotary body 21. The operating member 20, the rotary body 21, and the rotary click cam 26 are coupled to each other to be rotatable together. Among them, the operating member 20 and the rotary body 21 are coupled to each other to be movable back and forth together.

When the rotary operation is performed on the operating member 20, the rotary click cam 26 rotates along with the operating member 20. This causes the contacts S1 to S4 of the contactors 30a to 30d provided on the case 28 to move over the rear surface of the rotary contact plate 27 fixed on the rotary click cam 26. According to this movement, the contactors 30a to 30d repeatedly come in contact with and separate from the movable electrode 27b of the rotary contact plate 27. During this, when both of "at least one of the contactors 30c or 30d" and the "contactor 30a" are in contact with the movable electrode 27b, the fixed electrode 29a and the common electrode 29c are electrically connected to each other. When either the "contactor 30a" or "both of the contactors 30c and 30d" is out of contact from the movable electrode 27b, the fixed electrode 29a and the common electrode 29c are electrically separated from each other. When both of "at least one of the contactors 30c or 30d" and the "contactor 30b" are in contact with the movable electrode 27b, the fixed electrode 29b and the common electrode 29c are electrically connected to each other. When either the "contactor 30b" or "both of the contactors 30c and 30d" is out of contact from the movable electrode 27b, the fixed electrode 29b and the common electrode 29c are electrically separated from each other.

The rotation of the rotary click cam 26 causes the protrusions 25b of the click spring 25 to move over the uneven portion 26b of the rotary click cam 26. Each time the protrusion 25b climbs over a protrusion of the uneven portion 26b, a click feeling is given to the operator who operates the operating member 20.

When the push operation is performed on the operating member 20, the rotary body 21 and the push member 23 move backward along with the operating member 20, so that the push switch PS1 is pressed by the push member 23 and then turned on. When the push operation on the operating member 20 is released, the return spring 24 causes the operating member 20, the rotary body 21, and the push member 23 to return to respective original positions. Accordingly, the push switch PS1 is turned off. In this embodiment, the fixed electrodes 29c, 29d are electrically connected to each other while the push switch PS1 is in the ON state. The fixed electrodes 29c, 29d are electrically separated from each other while the push switch PS1 is in the OFF state.

The operating member 20 is rotatable by 360 degrees. In other words, the operating member 20 has a movable range of 360 degrees. Within the movable range of the operating member 20, there are a plurality of click points arranged at regular intervals. The plurality of click points correspond to positions of the respective recesses of the uneven portion 26b. The operating member 20 is configured to rotate (move) within the movable range while moving on the respective click points one after another. Each click point corresponds to a position of a recess of the uneven portion 26b as described above. Therefore, the operating member 20 is stable at each of the click points. Therefore, the operating member 20 is configured to rotate in one-click increments, where the one-click corresponds to an interval between adjacent two click points.

In the embodiment, each of the fixed electrodes 29a, 29b is electrically connected to or separated from the common electrode 29c in accordance with the rotary operation performed on the operating member 20, as described above. Each of the fixed electrodes 29a, 29b has an electrical state that changes depending on whether it is electrically connected to or separated from the common electrode 29c. The fixed electrode 29d is electrically connected to or separated from the common electrode 29c in accordance with the push operation performed on the operating member 20. The fixed electrode 29d also has an electrical state that changes depending on whether it is electrically connected to or separated from the common electrode 29c. As used herein, the "electrical state" indicates an electrostatic capacitance value of the fixed electrode 29a, 29b, 29d, an amount of electric charge which the fixed electrode 29a, 29b, 29d can output, or an electric potential which the fixed electrode 29a, 29b, 29d can output. That is, when a fixed electrode 29a, 29b, 29d comes to be electrically connected to the common electrode 29c, the electrostatic capacitance value of this fixed electrode 29a, 29b, 29d increases (changes) by the amount corresponding to the electrostatic capacitance value of the common electrode. Accordingly, the amount of electric charge which the fixed electrode 29a, 29b, 29d can output also increases by the amount of electric charge accumulated on the common electrode 29c. Moreover, the electric potential to be output from the fixed electrode 29a, 29b, 29d also increases (changes).

In the following description, an electrical state of each fixed electrode 29a, 29b, 29d in a state where this fixed electrode 29a, 29b, 29d is electrically connected to the common electrode 29c may be referred to as a "conductive state" (or High state, H-state). An electrical state of each fixed electrode 29a, 29b, 29d in a state where this fixed electrode 29a, 29b, 29d is electrically separated from the common electrode 29c may be referred to as a "cut-off state" (or Low state, L-state). The electrical state of each fixed electrode 29a, 29b, 29d changes from the conductive state to the cut-off state and vice versa, in accordance with the movement of the operating member 20.

(Details of Touchscreen Panel Body)

Figure 9:
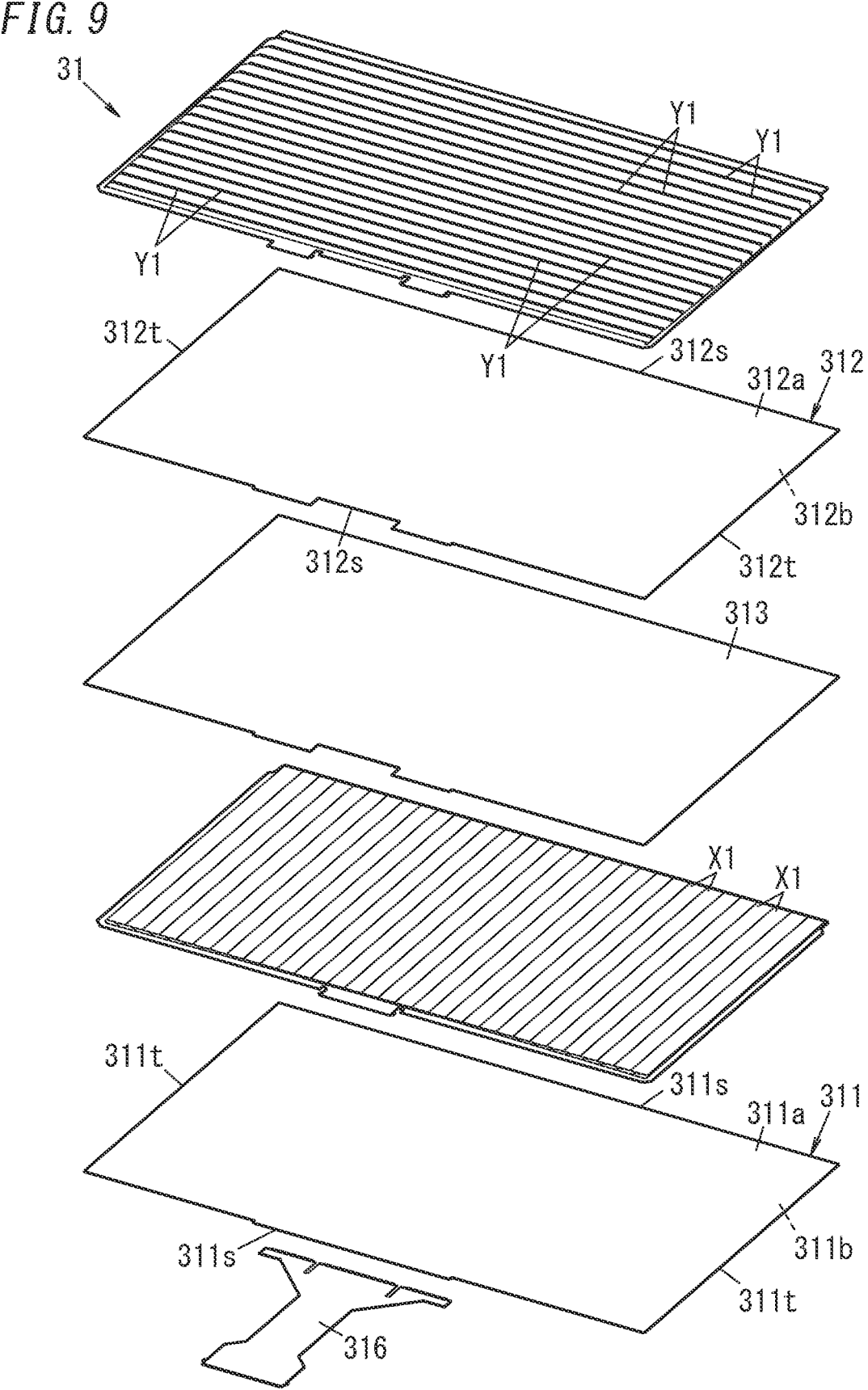
FIG. 9 is a perspective view of a touchscreen panel body included in the input system shown in FIG. 2.

As shown in FIG. 9, the touchscreen panel body 31 includes a plurality of first line electrodes X1, a plurality of second line electrodes Y2, a film substrate 311, a film substrate 312, an optically transparent adhesive sheet 313, a driver circuit 314, and a detection circuit 315. In the following description, when the plurality of first line electrodes X1 need to be distinguished from each other, the plurality of first line electrodes X1 will be hereinafter designated by the reference signs X11, X12, X13, and so on (see FIG. 10). Likewise, when the plurality of second line electrodes Y1 need to be distinguished from each other, the plurality of second line electrodes Y1 will be hereinafter designated by the reference signs Y11, Y12, Y13, and so on (see FIG. 10).

The film substrate 311 is made of a material with transparency (such as a resin or glass). The film substrate 311 is a rectangular sheet with two pairs of opposing sides 311s, 311t. Likewise, the film substrate 312, as well as the film substrate 311, is also a rectangular sheet with two pairs of opposing sides 312s, 312t. The film substrate 312 is a rectangular sheet with the same shape and same dimensions as the film substrate 311. The plurality of first line electrodes X1 and the plurality of second line electrodes Y1 are made of an electrically conductive material with transparency, such as indium tin oxide (ITO).

The plurality of first line electrodes X1 are formed as a film over a front surface 311a of the film substrate 311. On the front surface 311a of the film substrate 311, the plurality of first line electrodes X1 extend parallel to each other along the one pair of opposing sides 311t of the front surface 311a and are arranged to be spaced apart from each other along the other pair of opposing sides 311s. Each of the plurality of first line electrodes X1 may have an elongate strip shape, for example (see FIG. 10). The plurality of first line electrodes X1 are connected to the driver circuit 314 via a flexible printed wiring board 316. The front surface 3a of the touchscreen panel 3 is substantially entirely covered with the plurality of first line electrodes X1.

Figure 10:
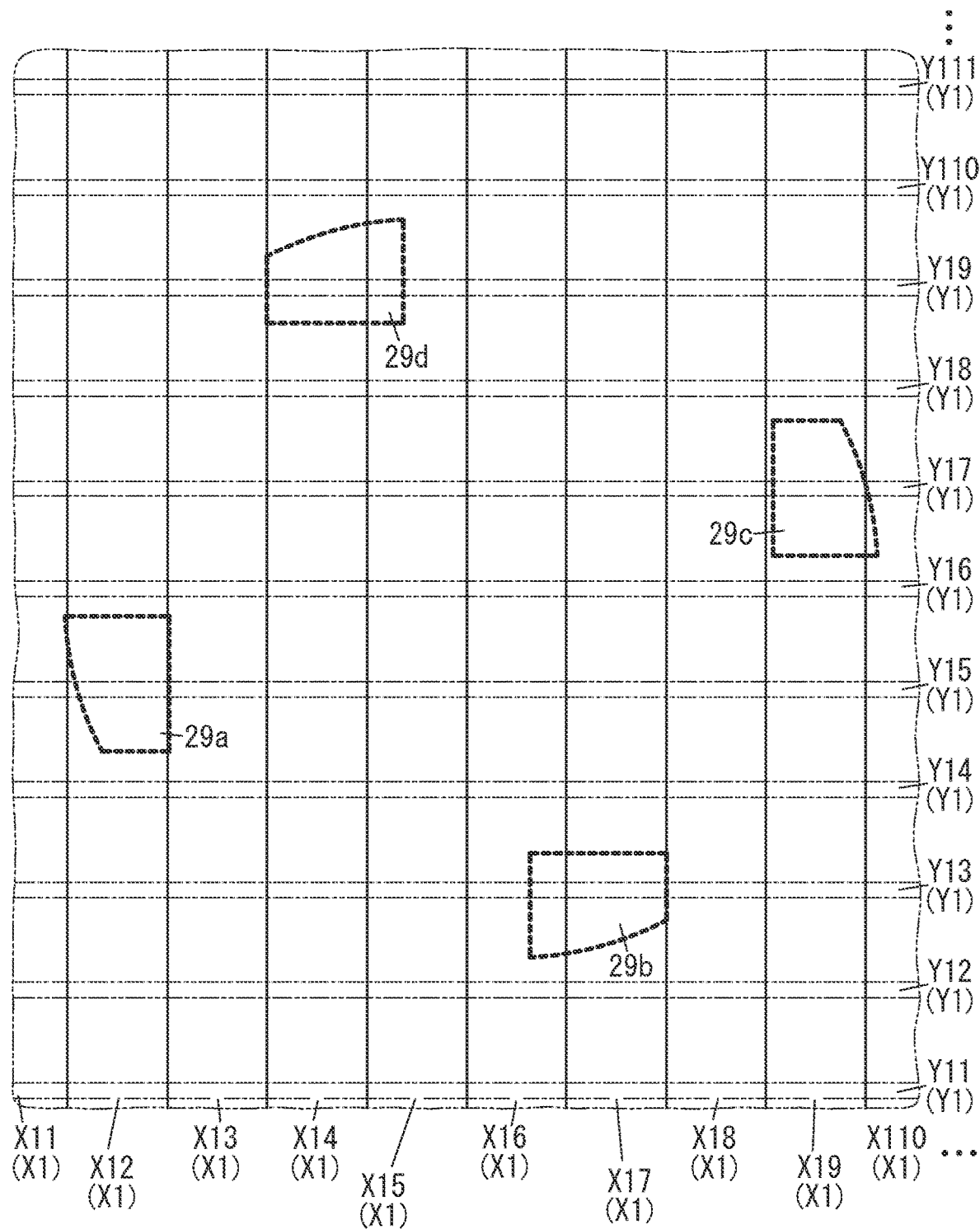
FIG. 10 is a plan view illustrating first line electrodes, second line electrodes and fixed electrodes as viewed from a side of a touchscreen panel.

The shape of the first line electrode X1 is not limited to that shown in FIGS. 9 and 10, but may have another shape such as a diamond patterned shape where a plurality of diamond-shaped pads are coupled to each other, or a shape where a plurality of broader portions and a plurality of narrower portions are regularly and repeatedly arranged to extend along an extending direction.

The plurality of second line electrodes Y1 are formed as a film over a front surface 312a of the film substrate 312. On the front surface 312a of the film substrate 312, the plurality of second line electrodes Y1 extend parallel to each other along the one pair of opposing sides 312s and are arranged along the other pair of opposing sides 312t. Each of the plurality of second line electrodes Y1 may have an elongate strip shape, for example. The plurality of second line electrodes Y1 are connected to the detection circuit 315 via the flexible printed wiring board 316. Each of the second line electrodes Y1 has a width smaller than a width of the first line electrode X1.

The second line electrode Y1 may have another shape, such as a diamond patterned shape where a plurality of diamond-shaped pads are coupled to each other, or a shape where a plurality of broader portions and a plurality of narrower portions are regularly and repeatedly arranged to extend along an extending direction.

The film substrates 311 and 312 are laid one on top of the other via the optically transparent adhesive sheet 313 to be bonded together. The optically transparent adhesive sheet 313 is sandwiched between the front surface 311a of the film substrate 311 and the rear surface 312b of the film substrate 312. The optically transparent adhesive sheet 313 is a member obtained by applying an adhesive onto both sides of a sheet with transparency.

In a state where the film substrates 311, 312 are bonded together, the plurality of second line electrodes Y1 intersects (at right angles) with the plurality of first line electrodes X1 when viewed along a normal to the film substrates 311, 312 (see FIG. 10). The plurality of first line electrodes X1 and the plurality of second line electrodes Y1 are placed to be spaced apart from each other via the film substrate 311 and the optically transparent adhesive sheet 313.

Onto the front surface 312a of the film substrate 312, the cover panel 32 (see FIG. 2) is bonded with an optically transparent adhesive sheet. Onto the rear surface 311b of the film substrate 311, a metal plate 5 (see FIG. 2) is bonded with a double-sided adhesive tape.

The driver circuit 314 selectively applies, on a one-by-one basis, a scan voltage to the plurality of first line electrodes X1 from a first line electrode X11 located at one end toward a first line electrode X1n located at the other end. In addition, the driver circuit 314 connects the other first line electrodes X1, to which no scan voltage is applied, to a reference potential (i.e., a ground potential).

The detection circuit 315 selectively detects, as an output voltage, a voltage between a first line electrode X1 to which the scan voltage is being applied and the plurality of second line electrodes Y1, on a one-by-one basis, from a second line electrode Y11 located at one end toward a second line electrode Y1n located at the other end, with respect to each first line electrode X1 to which the scan voltage is applied. This allows the detection circuit 315 to detect any second line electrode Y1, of which the electrostatic capacitance value has changed. Specifically, when the operator touches, at an arbitrary point, the front surface 3a of the touchscreen panel 3, the electrostatic capacitance value of the second line electrode Y1 overlapping with the point of touch changes. The detection circuit 315 detects such a change in the output voltage (the electrostatic capacitance value) of a second line electrode Y1 in a described manner, and detects the point of touch on the front surface 3a of the touchscreen panel 3, based on a location of a first line electrode X1 selected and a location of a second line electrode Y1 selected when the change in the output voltage is detected. Such a function of detecting the point of touch will be hereinafter referred to as a "point of touch detection function".

In a state where the input device 2 is placed on the front surface 3a of the touchscreen panel 3, the detection circuit 315 detects, when an operation (rotary operation or push operation) is performed on the operating member 20 of the input device 2, the operation performed on the operating member 20 with the point of touch detection function.

The detection circuit 315 is configured to perform calibration on an output voltage of each second line electrode Y1 when the touchscreen panel 3 is activated (at power-on). As used herein, the "calibration" refers to a process of correcting the output voltage of each second line electrode Y1 so as to eliminate the influence caused by a metal electrode (such as the fixed electrodes 29a to 29d of the input device 2) which is present on the touchscreen panel 3 when the touchscreen panel 3 is activated.

The detection circuit 315 is an example of a signal processor configured to perform signal processing on an output voltage of the line electrode Y1.

Next, it will be described with reference to FIG. 10 how the detection circuit 315 operates (specifically, how to detect the electrical states of the fixed electrodes 29a, 29b, 29d when the operation is performed on the operating member 20).

In FIG. 10, the plurality of first line electrodes X1 extend in the upward/downward direction and are arranged in the rightward/leftward direction on the paper on which FIG. 10 is drawn. On the other hand, the plurality of second line electrodes Y1 extend in the rightward/leftward direction and are arranged in the upward/downward direction on the paper on which FIG. 10 is drawn. In FIG. 10, the plurality of second line electrodes Y1 are arranged behind the plurality of first line electrodes X1 (to the eyes of a viewer who is looking along a normal to the paper at FIG. 9).

As shown, the input device 2 is placed on the front surface 3a of the touchscreen panel 3 such that the fixed electrodes 29a to 29d do not overlap with each other along the longitudinal axis of the first line electrodes X1. In other words, any two of the fixed electrodes 29a to 29d do not overlap with the same first line electrode X1 when viewed from the front side of the touchscreen panel 3.

When the rotary operation is performed on the operating member 20 of the input device 2, the rotary click cam 26 rotates accordingly. According to this movement, each of the contactors 30a to 30c repeatedly alternates connection and separation with respect to the movable electrode 27b of the rotary contact plate 27. This causes each fixed electrode 29a, 29b to alternate a state electrically connected to the common electrode 29c (H-state) and a state electrically separated from the common electrode 29c (L-state).

The touchscreen panel 3 detects, based on the point of touch detection function, the electrical state of each of the fixed electrodes 29a, 29b whether it is the conductive state or the cut-off state. It will be assumed an exemplary case where the fixed electrodes 29a, 29c are electrically connected to each other and the fixed electrodes 29b, 29c are electrically separated from each other.

The fixed electrode 29a is capacitively coupled with a first line electrode X12 and the common electrode 29c is capacitively coupled with a first line electrode X19 connected to the reference potential. Therefore, when the scan voltage is selectively applied to the first line electrode X12 and the rest of the plurality of first line electrodes X1 are connected to the reference potential (i.e., a ground potential), electric charges of both the fixed electrodes 29a, 29c are discharged to the reference potential through the first line electrode X19. As a result of this electric discharge, change in the electrostatic capacitance value between the first line electrode X12 and the fixed electrode 29a becomes comparatively large. The detection circuit 315 of the touchscreen panel 3 detects this large change in the electrostatic capacitance value, based on the output voltage of the second line electrode Y15 that overlaps with the fixed electrode 29a.

The fixed electrode 29b is capacitively coupled with the first line electrodes X16, X17. Therefore, when the scan voltage is selectively applied to a first line electrode X17 and the rest of the plurality of first line electrodes X1 are connected to the reference potential (i.e., a ground potential), an electric charge of the fixed electrode 29b is discharged to the reference potential through the first line electrode X16. It should be noted that the electrostatic capacitance value of the common electrode 29c is not added to that of the fixed electrode 29b, since the fixed electrode 29b is electrically separated from the common electrode 29c. Therefore, change in the electrostatic capacitance value between the first line electrode X17 and the fixed electrode 29b is not large. The detection circuit 315 of the touchscreen panel 3 detects this little change in the electrostatic capacitance value, based on the output voltage of the second line electrode Y13 that overlaps with the fixed electrode 29b.

According to this manner, the detection circuit 315 detects the electrical states of the fixed electrodes 29a, 29b based on the output signals of the line electrodes Y1, while the rotary operation is performed on the operating member 20.

Meanwhile, when the push operation is performed on the operating member 20, the push switch PS1 is turned to the ON state to electrically connect the fixed electrodes 29d, 29c with each other. The fixed electrode 29d is capacitively coupled with a first line electrodes X14, and the common electrode 29c is capacitively coupled with a first line electrode X19 connected to the reference potential. Therefore, when the scan voltage is selectively applied to the first line electrode X14 and the rest of the plurality of first line electrodes X1 are connected to the reference potential (i.e., a ground potential), electric charges of both the fixed electrodes 29d, 29c are discharged to the reference potential through the first line electrode X19. As a result of this electric discharge, change in the electrostatic capacitance value between the first line electrode X14 and the fixed electrode 29d becomes comparatively large. The detection circuit 315 of the touchscreen panel 3 detects this large change in the electrostatic capacitance value, based on the output voltage of the second line electrode Y19 that overlaps with the fixed electrode 29d. Note that when the push switch PS1 is in the OFF state, the fixed electrode 29d is electrically separated from the common electrode 29c, and thus change in the electrostatic capacitance value between the first line electrode X14 and the fixed electrode 29d is not large. The detection circuit 315 of the touchscreen panel 3 detects this little change in the electrostatic capacitance value, based on the output voltage of the second line electrode Y19 that overlaps with the fixed electrode 29d.

According to this manner, the detection circuit 315 detects the electrical state of the fixed electrode 29d based on the output signals of the line electrodes Y1, when the push operation is performed on the operating member 20.

In the exemplary case described above where the rotary operation is performed, the fixed electrode 29a in the conductive state has the increased output voltage of the second line electrode Y15, whereas the fixed electrode 29b in the cut-off state has the output voltage of the second line electrode Y13 changed not so much. In this case, the electrical state of the fixed electrode 29a is larger than the electrical state of the fixed electrode 29b. Based on the output voltages of the second line electrodes Y13, Y15, the detection circuit 315 further detects a "relative relationship between the electrical states of the fixed electrodes 29a, 29b".

In response to the rotary operation performed on the operating member 20, the electrical state of each of the fixed electrodes 29a, 29b changes (between the conductive state and the cut-off state). The detection circuit 315 then detects the relative relationship (such as magnitude relationship) between the electrical states of the fixed electrodes 29a, 29b, based on the output voltages of the second line electrodes Y13, Y15 that overlap with the respective fixed electrodes 29a, 29b. To be described later, the detection circuit 315 further determines, based on the relative relationship thus detected, whether the electrical state of each of the fixed electrodes 29a, 29b is the conductive state or the cut-off state. Furthermore, the detection circuit 315 detects the rotational position of the operating member 20 based on the electrical states of the fixed electrodes 29a, 29b thus determined, and detects the rotational position in time series. According to this detection result, the detection circuit 315 detects the rotation amount and the rotation direction of the operating member 20.

(Feature of Input System)

It will be described the features of the input system 1. The input system 1 is configured such that the electrical states of the fixed electrodes 29a, 29b change total one time when the operating member 20 rotates by the amount of the one-click.

Hereinafter, an electrical state of each of the fixed electrodes 29a, 29b may be referred to as an "individual electrical state", and an entirety of the electrical states of the fixed electrodes 29a, 29b may be referred to as an "entire electrical state". In the present disclosure, the feature "the electrical states of the fixed electrodes 29a, 29b change total one time when the operating member 20 rotates by the amount of the one-click" mentioned above means that the entire electrical state of the fixed electrodes 29a, 29b changes only one time when the operating member 20 rotates by the amount of the one-click. In the present embodiment, the individual electrical states of the fixed electrodes 29a, 29b do not change at the same time as each other.

Described with reference to FIG. 11 and FIGS. 12A to 12D is an aspect of the entire electrical state of the fixed electrodes 29a, 29b when the operating member 20 rotates. Hereinafter, the individual electrical state of each fixed electrode 29a, 29b when this fixed electrode 29a, 29b is electrically connected to the common electrode 29c, namely the H-state, is simply expressed as "H", as described above. Also, the individual electrical state of each fixed electrode 29a, 29b when this fixed electrode 29a, 29b is electrically separated from the common electrode 29c, namely the L-state, is simply expressed as "L". The individual electrical states of the fixed electrodes 29a, 29b, hereinafter expressed by "Q1" and "Q2", respectively, each change between two states "H" and "L", in accordance with the movement of the operating member 20. The entire electrical state of the fixed electrodes 29a, 29b, hereinafter expressed by "Q12", refers to a combination of the individual electrical states of the fixed electrodes 29a, 29b, and may be expressed by "(Q1, Q2)". That is, Q12=(Q1, Q2). The entire electrical state Q12 of the fixed electrodes 29a, 29b can change among four states (a plurality of states), (H, L), (L, H), (H, L), and (L, L), in accordance with the movement of the operating member 20. In the present embodiment, it is configured such that the entire electrical state Q12 of the fixed electrodes 29a, 29b changes only one time when the operating member 20 rotates by the amount of the one-click. As described above, the "amount of one-click" indicates an interval between adjacent two click points.

Figure 11:
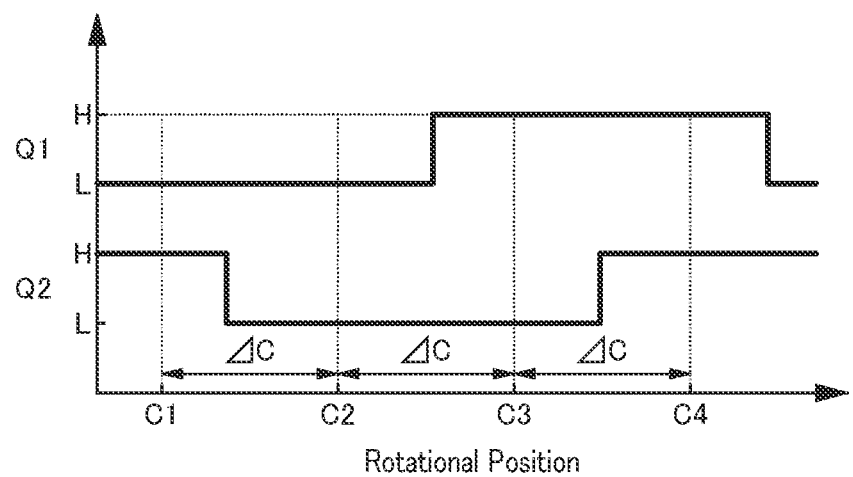
FIG. 11 is an exemplary view illustrating a change in electrical states of the fixed electrodes when the operating member rotates.

As shown in FIG. 11, in the present embodiment, the electrical sate Q12 (=(Q1, Q2)) is (L, H) when the operating member 20 is located at a rotational position of the click point C1. While the operating member 20 rotates and moves over the click points C2, C3, . . . , one after another, the electrical state Q12 changes from (L, H) to (L, L), and to (H, L), and to (H, H), with respect to each one-click ΔC rotation of the operating member from the click point C1.

Figure 12A:
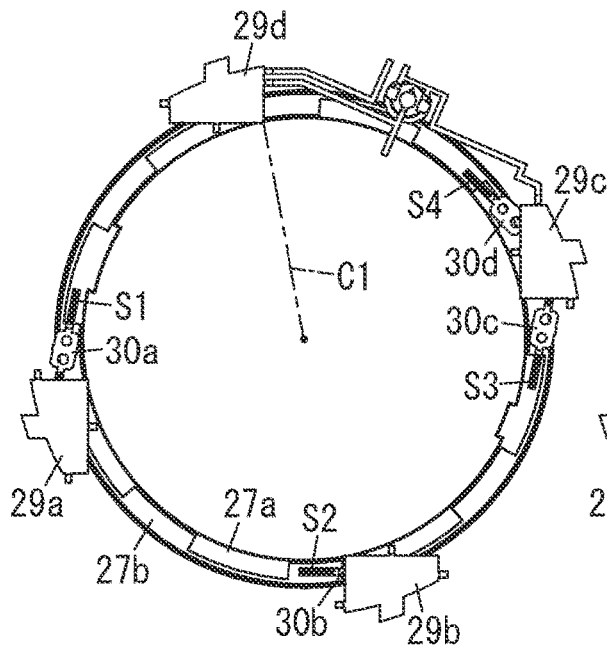
FIG. 12A to FIG. 12D are exemplary views illustrating electrical connection between the fixed electrodes and a movable electrode.
Figure 12B:
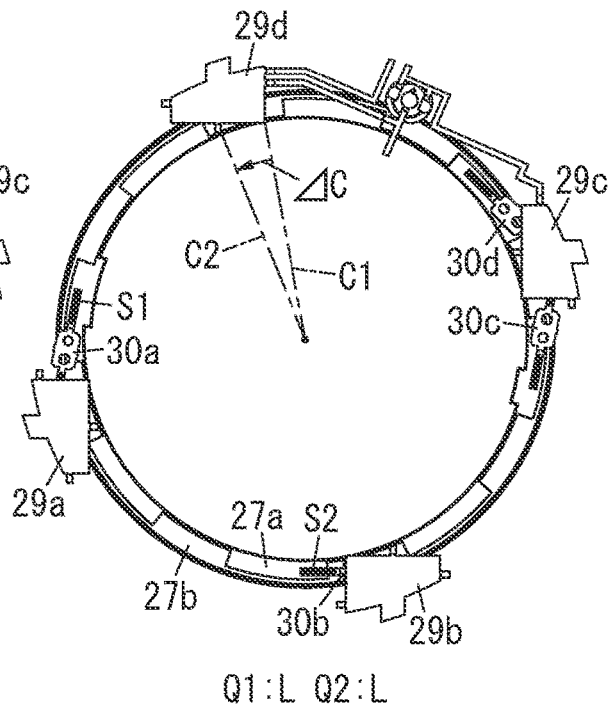
Figure 12C:
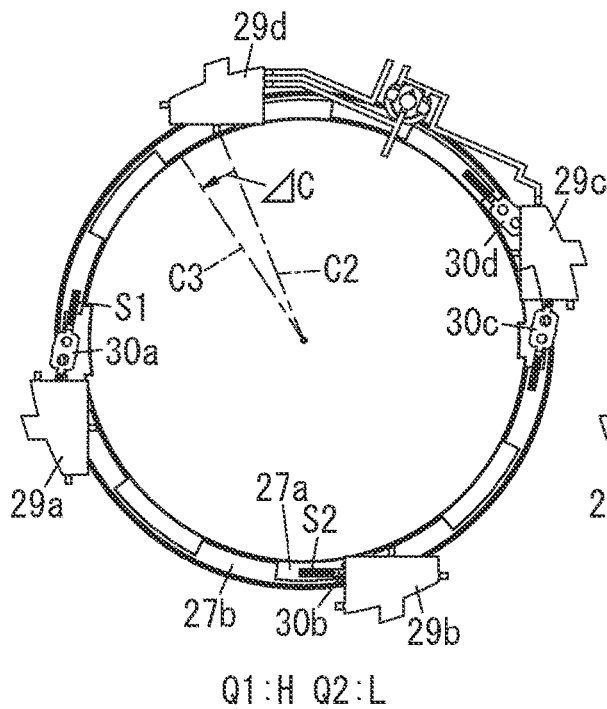
Figure 12D:
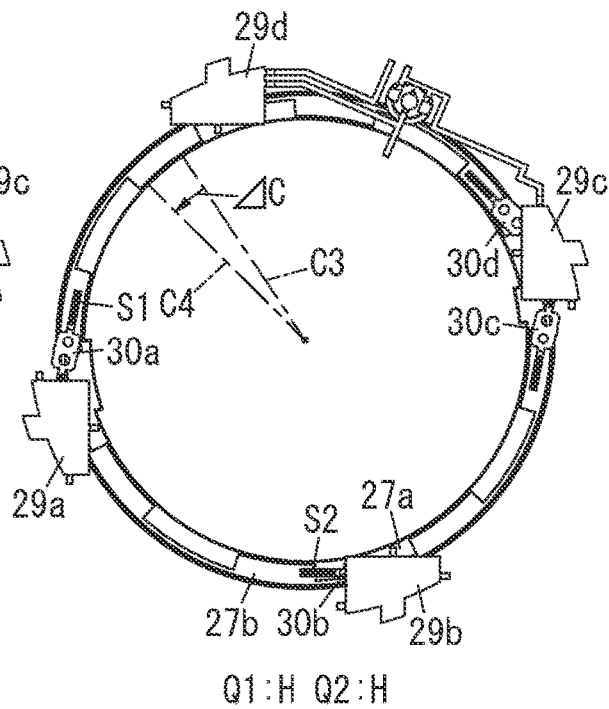

Explained in more detail, when the operating member 20 is located at the click point C1 as shown in FIG. 12A, the contacts S1, S3 of the respective contactors 30a, 30c are separated from the movable electrode 27b, while the contacts S2, S4 of the respective contactors 30b, 30d are in contact with the movable electrode 27b. At such a location, the fixed electrode 29a is electrically separated from the common electrode 29c, while the fixed electrode 29b is electrically connected to the common electrode 29c. Therefore, the electrical state Q12 is (L, H). When the operating member 20 rotates from the click point C1 and reaches the click point C2 as shown in FIG. 12B, the contacts S1 to S4 of the respective contactors 30a to 30d are separated from the movable electrode 27b. At such a location, both the fixed electrodes 29a, 29b are electrically separated from the common electrode 29c. Therefore, the electrical state Q12 is (L, L). When the operating member 20 further rotates from the click point C2 and reaches the click point C3 as shown in FIG. 12C, the contacts S1, S3 of the respective contactor 30a, 30c are in contact with the movable electrode 27b, while the contacts S2, S4 of the respective contactors 30b, 30d are separated from the movable electrode 27b. At such a location, the fixed electrode 29a is electrically connected to the common electrode 29c, while the fixed electrode 29b is electrically separated from the common electrode 29c. Therefore, the electrical state Q12 is (H, L). When the operating member 20 further rotates from the click point C3 and reaches the click point C4 as shown in FIG. 12D, the contacts S1 to S4 of the respective contactors 30a to 30d are in contact with the movable electrode 27b. At such a location, both the fixed electrodes 29a, 29b are electrically connected to the common electrode 29c. Therefore, the electrical state Q12 is (H, H).

As can be seen from the above, in the embodiment, the entire electrical state Q12 of the fixed electrodes 29a, 29b changes only one time when the operating member 20 rotates by the amount of the one-click. This can lengthen the time interval between time points at which the individual electrical state Q1 (or Q2) of the fixed electrode 29a (or 29b) changes. As a result, the output voltages of the plurality of line electrodes Y1 can be read out with a high scan speed and a reduced read error while the rotary operation is performed on the input device 2 placed on the touchscreen panel 3. This can improve the read-out responsiveness to the scan speed.

Figure 13:
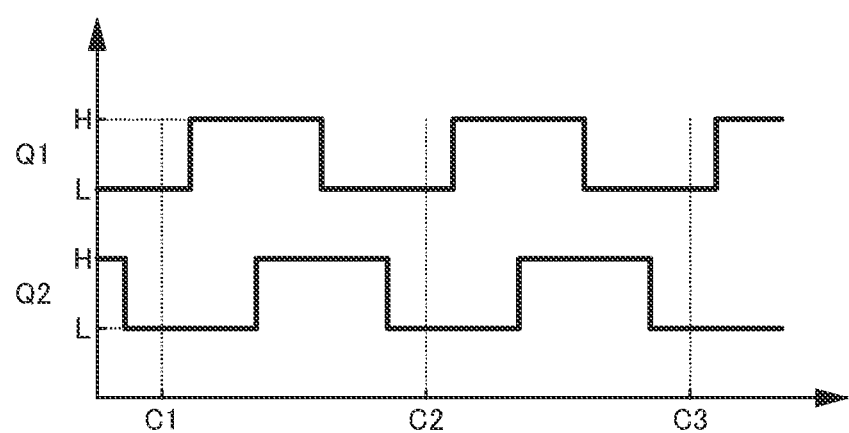
FIG. 13 is an exemplary view illustrating a change in electrical states of fixed electrodes when an operating member rotates, according to a comparative example.

With reference to FIG. 13, it is described an aspect of an electrical state Q12 (=(Q1, Q2)) according to an input device of a comparative example. The input device of the comparative example is configured such that the entire electrical state Q12 of fixed electrodes 29a, 29b is (L, L) every time an operating member 20 reaches a click point (e.g., at each of C1 to C3). In the comparative example, therefore, the electrical state Q12 changes total four times, from (L, L), through (H, L), (H, H), and (L, H), to (L, L), when the operating member 20 rotates from a click point C1 to a next click point C2, namely rotates by the amount of one-click ΔC.

As described above, the input device of the comparative example is configured such that the electrical state Q12 changes four times when the operating member 20 rotates by the amount of the one-click. Therefore, in the comparative example, the time interval between time points at which an individual electrical state Q1 (or Q2) changes is shorter than that of the present embodiment. According to the comparative example therefore, the read error may occur when the output voltages of the plurality of line electrodes Y1 are read out with a high scan speed while the rotary operation is performed on the input device placed on the touchscreen panel 3. In contrast, in the present embodiment, the input device 2 is configured such that the electrical state Q12 changes only one time when the operating member 20 rotates by the amount of the one-click. This can reduce the read error of the output voltages of the line electrodes Y1, and thus can improve the read-out responsiveness with respect to the scan of the line electrode Y1.

It will be described the calibration with respect to the output voltage of the line electrode Y1 performed by the touchscreen panel 3.

In a touchscreen panel of a comparative (conventional) example, an electrical state of a fixed electrode 29a, 29b is determined to be an H-state (conductive state) when an output voltage of a specific line electrode Y1 exceeds a first threshold, where the specific line electrode Y1 is a line electrode Y1 that overlaps with this fixed electrode 29a, 29b when viewed along a normal to a front surface of the touchscreen panel. The first threshold is a threshold for use to determine whether a fixed electrode 29a, 29b that overlaps with a line electrode Y1 is in a conductive state or in a cut-off state. Also, when the output voltage of the line electrode Y1 does not exceed the first threshold, the electrical state of the fixed electrode 29a, 29b that overlaps with this first electrode Y1 is determined to be an L-state (cut-off state). The comparative example determines the electrical states of the fixed electrodes 29a, 29b of the input device 2 as described manner, and detects a rotary operation (rotation amount and rotation direction) performed on the input device 2 based on the determination result (such as time series data of the electrical states of the fixed electrodes 29a, 29b).

Furthermore, the touchscreen panel of the comparative (conventional) example is configured to perform a calibration on the output voltage of the line electrode Y1 (referred to as a "normal calibration") to correct the output voltage of the line electrode Y1 so as to eliminate the influence caused by an electrostatic capacitance value of a metal electrode present on the line electrode Y1 when the touchscreen panel is activated (at power-on). It will be assumed a case where the calibration is performed onto an output voltage of a specific line electrode Y1 that overlaps with a fixed electrode 29a, 29b when this fixed electrode 29a, 29b is electrically connected to a common electrode 29c in the input device 2 placed on the touchscreen panel 3. In this case, the calibration is performed with a correction value corresponding to a sum of an electrostatic capacitance value of the fixed electrode 29a and an electrostatic capacitance value of the common electrode 29c. However, this correction is excessive by the amount of the electrostatic capacitance value of the common electrode 29c. In this case therefore, the output voltage (corrected output voltage) output from this line electrode Y1 that has been excessively corrected in this manner may not excess a predetermined threshold even when the electrical state of this fixed electrode 29a, 29b is H-state. As a result, the H-state of the electrical state of the fixed electrodes 29a, 29b cannot be correctly detected, and accordingly the rotary operation performed on the input device 2 cannot be detected correctly.

In general (i.e., not only in the touchscreen panel of the comparative example but also in the touchscreen panel 3 of the present embodiment), a calibration is performed at a click point. Therefore, in order to avoid the excess correction described above, it is desirable that the entire electrical state Q12 of the fixed electrodes 29a, 29b be (L, L) at the click point. However, the present embodiment is configured such that the electrical state Q12 changes only one time when the operating member 20 rotates by the amount of the one-click, and thus the electrical state Q12 may not be (L, L) at some click points. The present embodiment is therefore configured to perform a calibration according to the manner described hereinafter to avoid the excess correction in spite of the fact that the electrical state Q12 is not (L, L) at some click points. The calibration of the present embodiment will be described below.

In the touchscreen panel 3 of the present embodiment, the detection circuit 315 performs mutually different calibration on line electrodes Y1 overlapping with the fixed electrodes 29a to 29d of the input device 2 when viewed along a normal to the front surface 3a of the touchscreen panel 3 (referred to as a "specific line electrode") and on line electrodes Y1 not overlapping with any of the fixed electrodes 29a to 29d of the input device 2 when viewed along a normal to the front surface 3a of the touchscreen panel 3 (referred to as a "line electrode other than the specific line electrode").

Specifically, the detection circuit 315 performs the "normal calibration" described above, on the line electrodes Y1 not overlapping with any of the fixed electrodes 29a to 29d of the input device 2. On the other hand, on the line electrodes Y1 overlapping with the fixed electrodes 29a to 29d of the input device 2, the detection circuit 315 does not perform such a calibration (e.g., the "normal calibration" described above) that may change a relative relationship (such as magnitude relationship) between the individual electrical states of the fixed electrodes 29a, 29b. In this case, the detection circuit 315 performs, on the line electrodes Y1 overlapping with the fixed electrodes 29a to 29d of the input device 2, a calibration with a correction value of zero. That is to say, on the output voltages of the line electrodes Y1 overlapping with the fixed electrodes 29a, 29b, the detection circuit 315 performs a calibration such that the "relative relationship between the (individual) electrical states of the fixed electrodes 29a, 29b" is maintained before and after the calibration.

It should be noted that performing the calibration with the correction value of zero described above is substantially the same as not performing any calibration. Therefore, the present embodiment may be configured to perform no calibration on the output voltages of the line electrodes Y1 overlapping with the fixed electrodes 29a to 29d. In this case, the line electrodes Y1 not overlapping with any of the fixed electrodes 29a to 29d are subjected to the calibration (such as the "normal calibration") on their output voltages, whereas the line electrodes Y1 overlapping with the fixed electrodes 29a to 29d are subjected to no calibration on their output voltages.

Furthermore, the detection circuit 315 is configured to detect the rotary operation performed on the input device 2 based on the output voltages of the line electrodes Y1 overlapping with the fixed electrodes 29a to 29d of the input device 2. For performing this detection, the detection circuit 315 determines, based on the "relative relationship between the individual electrical states of the fixed electrodes 29a, 29b", the individual electrical states of the respective fixed electrodes 29a, 29b. The detection circuit 315 further determines, based on this determination result, the rotational position of the operating member 20. Furthermore, the detection circuit 315 determines, based on the time series data of the rotational position thus determined, the rotation amount and the rotation direction of the rotary operation performed on the operating member 20.

Figure 14:
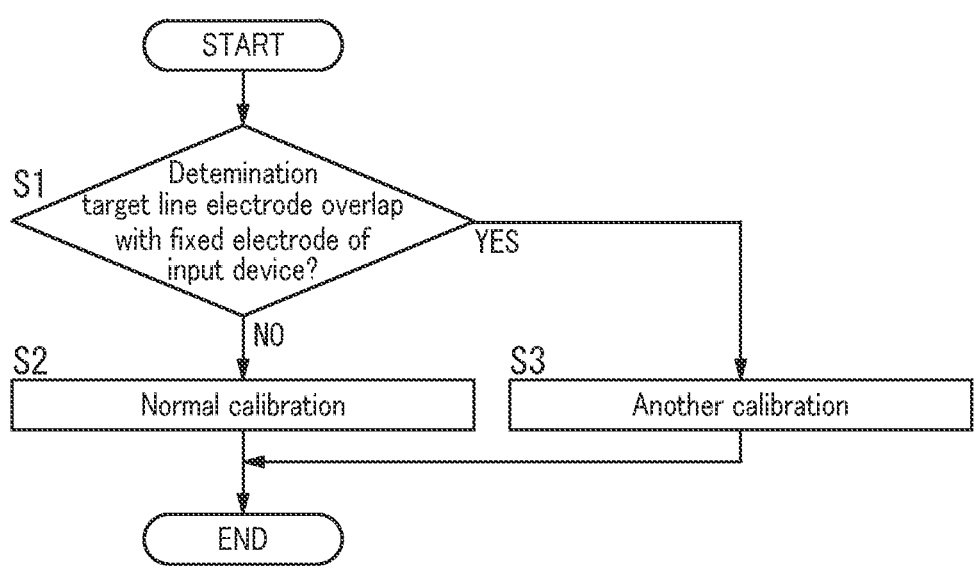
FIG. 14 is a flowchart illustrating an operation of a detection circuit.

Next, it will be described with reference to the flowchart of FIG. 14 how the detection circuit 315 performs the above-described calibration. The detection circuit 315 sequentially performs, on the plurality of line electrodes Y1, a set of processing of steps S1 to S3. In the step S1, the detection circuit 315 determines whether a line electrode Y1 as a determination target overlaps with any one of the fixed electrodes 29a to 29d of the input device 2 or not. Specifically, the detection circuit 315 determines whether an output voltage of the line electrode Y1 as the determination target exceeds a second threshold or not. The second threshold is a threshold for use to determine whether any of the fixed electrodes 29a to 29d is placed on a line electrode Y1 or not. The second threshold is lower than the first threshold described above.

When finding that the output voltage exceeds the second threshold, the detection circuit 315 determines that the line electrode Y1 as the determination target overlaps with any one of the fixed electrodes 29a to 29d. On the other hand, when finding that the output voltage does not exceed the second threshold, the detection circuit 315 determines that the line electrode Y1 as the determination target does not overlap with any of the fixed electrodes 29a to 29d. This determination criterion uses the fact that if a fixed electrode 29a to 29d overlaps with a line electrode Y1, the electrostatic capacitance value of this fixed electrode 29a to 29d should increase an output voltage of this line electrode Y1 to cause the voltage to exceed the second threshold.

When determining that the line electrode Y1 as the determination target does not overlap with any of the fixed electrodes 29a to 29d of the input device 2 (i.e., step S1 is No), the detection circuit 315 performs the normal calibration described above on the output voltage of the line electrode Y1 as the determination target (step S2), and the process is ended. On the other hand, when determining that the line electrode Y1 of the determination target overlaps with any one of the fixed electrodes 29a to 29d of the input device 2 (i.e., step S1 is Yes), the detection circuit 315 performs a calibration different from the normal calibration on the output voltage of the line electrode Y1 as the determination target (step S3), and the process is ended. For example, the detection circuit 315 performs the calibration with the correction value of zero. Alternatively, the detection circuit 315 may not perform any calibration on the output voltage of the line electrode Y1 that overlaps with any one of the fixed electrodes 29a to 29d of the input device 2 in the step S3.

Figure 15:
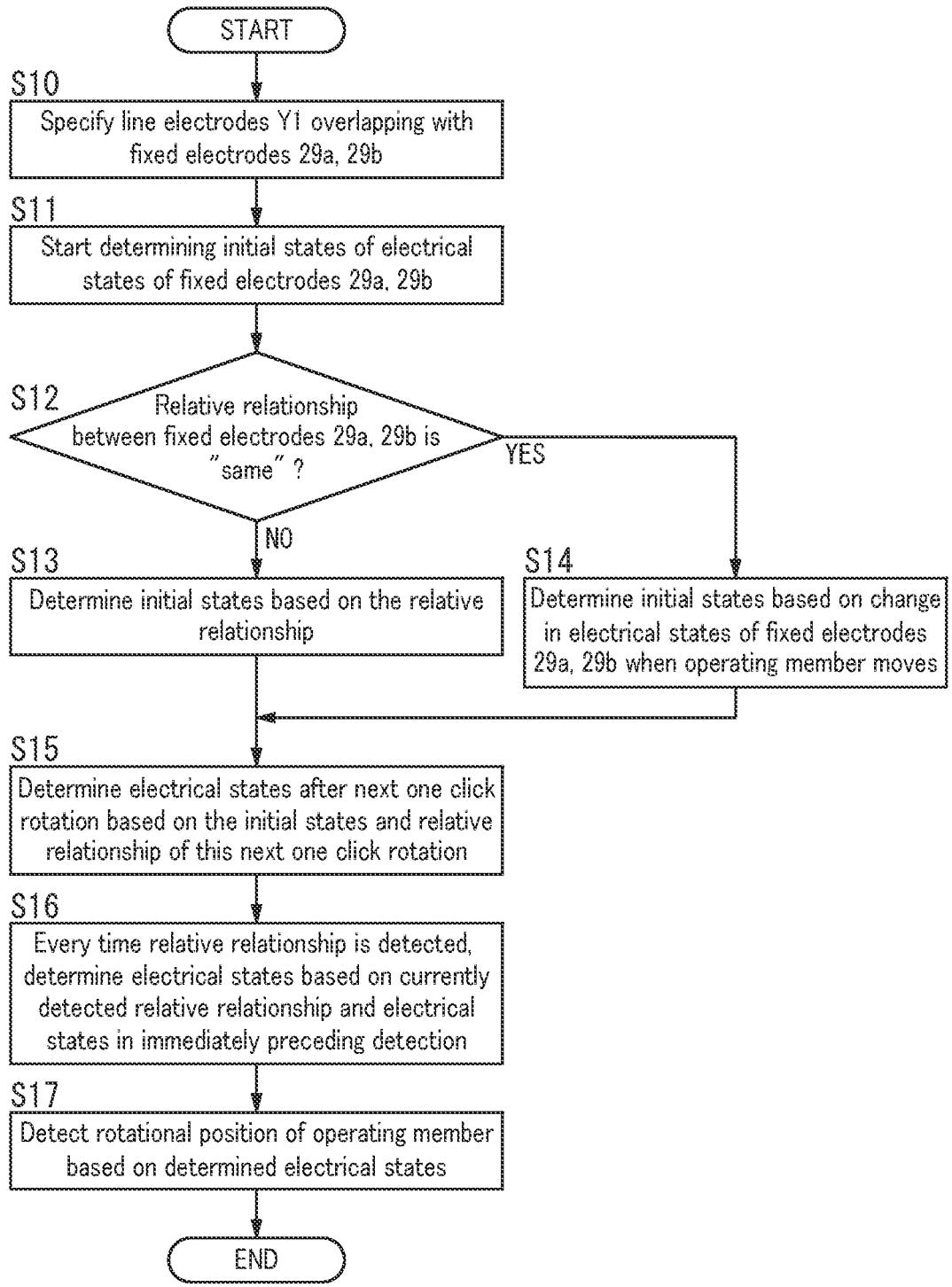
FIG. 15 is a flowchart illustrating another operation of the detection circuit.

Next, it will be described with reference to FIG. 15 how the detection circuit 315 detects the rotational position of the operating member 20. In the present embodiment, the calibration with the correction value of zero is performed on the output voltages of the line electrodes Y1 overlapping with the fixed electrodes 29a to 29d of the input device 2 (that is, substantially no calibration is performed thereon), out of the plurality of line electrodes Y1. This means that the output voltages of the line electrodes Y1 overlapping with the fixed electrodes 29a to 29d may possibly deviated by a certain voltage. Therefore, the determination method based on the first threshold described above may not be able to correctly determine the electrical states of the fixed electrodes 29a, 29b (whether it is the H-state or the L-state). In the present embodiment therefore, the information derivable from the output voltages of the line electrodes Y1 overlapping with the fixed electrodes 29a, 29b is only the relative relationship (such as the magnitude relationship) between the electrical states of the fixed electrodes 29a, 29b. It will be described how to detect the rotational position of the operating member 20 in such a case.

The detection circuit 315 specifies, from the plurality of line electrodes Y1, line electrodes Y1 that overlap with the fixed electrodes 29a, 29b (which are fixed electrodes relating to the detection of the rotational position of the operating member 20) (step S10). Specifically, among line electrodes Y1 that overlap with the four fixed electrodes 29a to 29d, the output voltage of each of the line electrodes Y1 that overlap with the fixed electrodes 29a, 29b changes in larger amount than the output voltage of each of the line electrodes Y1 that overlap with the other fixed electrodes 29c, 29d, when the rotary operation is performed on the input device 2 (i.e., when the operation member 20 rotates), for example. The detection circuit 315 specifies these line electrodes Y1 whose output voltages have changed in large amount, as the line electrodes Y1 that overlap with the fixed electrodes 29a, 29b. At that time, total two line electrodes Y1 may be specified, for example, one overlaps with the fixed electrode 29a and the other overlaps with the fixed electrode 29b. Hereinafter, these specified two line electrodes Y1 will be referred to as "specific line electrode(s) Y1".

Next, the detection circuit 315 starts a processing for determining initial states of the electrical states of the fixed electrodes 29a, 29b based on the output voltages of the specific line electrodes Y1 (step S11). Specifically, the detection circuit 315 determines whether the relative relationship (such as magnitude relationship) between the electrical states of the fixed electrodes 29a, 29b is "same" or not, based on the output voltages of the specific line electrodes Y1 (step S12). As used herein, the relative relationship is "same" means that the electrical states of the fixed electrodes 29a, 29b are the same as each other. Moreover, the relative relationship is "not same" means that the electrical states of the fixed electrodes 29a, 29b are not the same as (i.e., are different from) each other.

When determining that the relative relationship is "not same" (i.e., step S12 is No), the detection circuit 315 determines the above-described initial states based on the relative relationship between the electrical states of the fixed electrodes 29a, 29b (step S13). Specifically, the detection circuit 315 determines that the initial state for one of the fixed electrodes 29a, 29b whose electrical state is relatively large is the H-state (conductive state), and that the initial state for the other of the fixed electrodes 29a, 29b whose electrical state is relatively small is the L-state (cut-off state).

When determining that the relative relationship is "same" (i.e., step S12 is Yes), the detection circuit 315 determines the above-described initial states based on change in the output voltages of the specific line electrodes Y1 (i.e., based on change in the electrical states of the fixed electrodes 29a, 29b) when the operating member 20 rotates by the amount of the one-click from a position of the above relative relationship (step S14). That is, if the electrical states change as described above, then the relative relationship between the electrical states should be changed to "not same". Based on this, the detection circuit 315 determines that the initial state for one of the fixed electrodes 29a, 29b whose electrical state is relatively large is the H-state (conductive state), and the initial state for the other of them whose electrical state is relatively small is the L-state (cut-off state).

Explained in more detail for a case where the relative relationship described above is determined to be "same". In this case, it is possible to determine that the electrical states of the fixed electrodes 29a, 29b are the same as each other, but is not possible to determine whether the electrical states are the L-state or the H-state. However, if the operation member 20 moves from this position of the relative relationship, then the relative relationship should change and become "not same". Based on this, when found that an electrical state of either one of the fixed electrodes 29a, 29b decreases, an initial state of the decreased one is determined to be the L-state (cut-off state), and an initial state of the other of them is determined to be the H-state (conductive state).

Thereafter, when the operating member 20 further rotates by the amount of the one-click, the detection circuit 315 determines the electrical states of the fixed electrodes 29a, 29b after the further rotation by the amount of the one-click, based on the initial states thus determined and the output voltages of the specific line electrodes Y1 (i.e., the relative relationship between the electrical states of the fixed electrodes 29a, 29b) detected after the further rotation by the amount of the one-click (step S15).

In the present embodiment, the information derivable from the output voltages of the specific line electrodes Y1 is only the relative relationship between the fixed electrodes 29a, 29b as described above. For this reason, the initial states are firstly determined (estimated) based on the relative relationship between the electrical states of the fixed electrodes 29a, 29b, and then, the electrical states after a next rotation by the amount of the one-click are determined (specified) based on the initial states thus determined and the relative relationship detected after this next rotation by the amount of the one-click.

Thereafter, every time the relative relationship between the electrical states of the fixed electrodes 29a, 29b is detected based on the output voltages of the specific line electrodes Y1, the detection circuit 315 determines the electrical states based on the currently detected relative relationship and the electrical states determined in the immediately preceding detection (step S16).

Based on the results (i.e., the electrical states of the fixed electrodes 29a, 29b thus determined) in the steps S15, S16, the detection circuit 315 detects the rotational position of the operating member 20 of the input device 2 (step S17). In sum, in the present embodiment, the detection circuit 315 determines the initial states of the electrical states of the fixed electrodes 29a, 29b based on the relative relationship between the electrical states of the fixed electrodes 29a, 29b, and detects the rotational position (position) of the operating member 20 based on the initial states thus determined.

Hereinafter, it will be described a material of the movable electrode 27b of the rotary contact plate 27 of the input device 2. The movable electrode 27b is made of non-metal having electric conductivity. Examples of the non-metal having electric conductivity includes resin that contains electrically conductive filler (such as carbon filler). The movable electrode 27b made of the non-metal electric conductivity can prevent the welding of the movable electrode 27b on to the contactors 30a to 30b. This can omit the lubricant agent (such as grease) which may be applied to respective contact points between the movable electrode 27b and the contactors 30a to 30b for preventing the welding of the movable electrode 27b on to the contactors 30a to 30d. Accordingly, the leakage of the lubricant agent into the front surface 3a of the touchscreen panel 3 may not occur anymore. In the present embodiment, the contactors 30a to 30d are made of metal, and the movable electrode 27b is made of non-metal having electric conductivity, but the present disclosure is not limited to this. At least one of the movable electrode 27b or the contactors 30a to 30d may be made of non-metal having electric conductivity.

The present embodiment has a longer time interval between time points at which an electrical state Q1 (or Q2) changes than that of the comparative example. Therefore, the present embodiment has a longer contact time during which the movable electrode 27b and the contactor 30a to 30d are continuously in contact with each other than that of the comparative example. This can sufficiently ensure the electric conductivity when the movable electrode 27b and the contactor 30a to 30d are in contact with each other, even though one of the movable electrode 27b and the contactors 30a to 30d is(are) made of non-metal.

Technical Effect

The total number of times that the electrical states Q1, Q2 of the fixed electrodes 29a, 29b change when the operating member 20 rotates by the amount of the one-click is 1 in the present embodiment, but is not limited thereto. The total number of times may be the number other than a multiple of 4. In other words, the total number of times described above is an integer N, where the integer N is the number whose divisor does not include 4. The total number of times that the electrical states of the fixed electrodes 29a, 29b change between click points is therefore not limited to a multiple of 4. This can increase the degree of flexibility in the setting of the total number of times described above.

The total number of times described above may be less than 4, and may be 1. This can reduce the total number of times, compared to the comparative example described above. This can reduce the read error of the output voltages of the line electrodes Y1, and thus can improve the read-out responsiveness with respect to the scan of the line electrode Y1.

(Variations)

Some variations of the above embodiment are described hereinafter. The variations described below may be implemented in combination with each other.

(Variation 1)

In the embodiment described above, the detection circuit 315 is configured to determine the initial states of the fixed electrodes 29a, 29b from the relative relationship between the electrical states of the fixed electrodes 29a, 29b, and detect the rotational position of the operating member 20 based on the initial states and another relative relationship between the electrical states of the fixed electrodes 29a, 29b detected thereafter. Alternatively, the detection circuit 315 may be configured not to determine the initial states, but configured to, every time the relative relationship between the electrical states of the fixed electrodes 29a, 29b is detected, determine the electrical states of the fixed electrodes 29a, 29b at the time of the detection based on only the currently detected relative relationship. Specifically, when finding that the currently detected relative relationship is "not same", the detection circuit 315 determines the electrical states of the fixed electrodes 29a, 29b at the time of the detection based on the currently detected relative relationship. On the other hand, when finding that the currently detected relative relationship is "same", the detection circuit 315 determines the electrical states of the fixed electrodes 29a, 29b at the time of the detection, based on a change in the relative relationship when a state of the "immediately preceding relative relationship" changes to a state of the "current (i.e., currently detected) relative relationship". For example, when finding that an increase in the electrical state of a fixed electrode 29a has caused the immediately preceding relative relationship of "not same" to change to the current relative relationship of "same", the detection circuit 315 determines that the current relative relationship is a relative relationship where each of the electrical states of the fixed electrodes 29a, 29b is the H-state.

(Variation 2)

In the embodiment described above, the detection circuit 315 is configured to determine the initial states of the fixed electrodes 29a, 29b from the relative relationship between the electrical states of the fixed electrodes 29a, 29b, and detect the rotational position of the operating member 20 based on the initial states thus determined. The detection circuit 315 may determine, with the use of a conversion table, the electrical states of the fixed electrodes 29a, 29b based on the relative relationship between the electrical states of the fixed electrodes 29a, 29b. The conversion table indicates a correspondence relationship between: the relative relationship between the electrical states of the fixed electrodes 29a, 29b; and the electrical states of the fixed electrodes 29a, 29b.

(Variation 3)

In the embodiment described above, the detection circuit 315 performs the calibration when the touchscreen panel 3 is activated, but is not limited thereto. Additionally or alternatively, the detection circuit 315 may perform the calibration at another time, for example, when finding that the output voltage of the fixed electrode 29a, 29b is equal to or lower than a predetermined threshold due to the influence of the ambient temperature. The detection circuit 315 may be configured to perform mutually different calibration on line electrodes Y1 overlapping with the fixed electrodes 29a, 29b and line electrodes Y1 not overlapping with any of the fixed electrodes 29a, 29b.

Specifically, the detection circuit 315 performs the normal calibration described above on the line electrodes Y1 not overlapping with any of the fixed electrodes 29a, 29b, and performs a calibration different from the normal calibration on the line electrodes Y1 overlapping with the fixed electrodes 29a, 29b. The normal calibration is performed with a correction value that varies depending on an output voltage of the line electrode Y1 as a correction target. In this case, in the "calibration different from the normal calibration", an average value of correction values used for the normal correction (i.e., an average value of the correction values used for the correction on the respective line electrodes Y1 not overlapping with any of the fixed electrodes 29a, 29b) is used as a correction value. This can prevent the excess correction from being performed on the line electrodes Y1 overlapping with any one of the fixed electrodes 29a, 29b.

The influence of the ambient temperature will change the voltage values of whole of the line electrodes Y1 with a similar manner as each other. Therefore, the correction value used for the line electrodes Y1 overlapping with the fixed electrodes 29a, 29b is estimated as an average value of the correction values used for the line electrodes Y1 not overlapping with any of the fixed electrodes 29a, 29b.

(Variation 4)

In the embodiment described above, the plurality of first line electrodes X1 of the touchscreen panel 3 each are configured to be used as the point of touch detection function. Alternatively, the plurality of first line electrodes X1 may include, in addition to one or more line electrodes configured to be used as the point of touch detection function, another line electrode configured to be used for dedicatedly detecting a voltage variation in the fixed electrodes 29a to 29d of the input device 2. Further alternatively, all of the plurality of first line electrode X1 of the touchscreen panel 3 are configured to be used for dedicatedly detecting a voltage variation in the fixed electrodes 29a to 29d of the input device 2.

(Other Variations)

The two fixed electrodes 29a, 29b relate to the detection of the rotational position of the operating member 20 in the embodiment described above, but three or more fixed electrodes may be used. In this case, the electrical states of the fixed electrodes relating to the detection of the rotational position of the operating member 20 may change among four or more electrical states in accordance with the movement of the operating member 20.

The operating member 20 is the operating member of the rotary type in the embodiment described above, but may be an operating member of a slide type.

SUMMARY

An input device (2) of a first aspect includes at least two fixed electrodes (29a, 29b) and an operating member (20). The at least two fixed electrodes (29a, 29b) are configured to be placed to overlap with specific line electrodes (Y1) of a plurality of line electrodes (Y1). The operating member (20) is movable with respect to the at least two fixed electrodes (29a, 29b). The operating member (20) is movable within a movable range including a plurality of click points (e.g., C1 to C4). Electrical states (Q1, Q2) of the at least two fixed electrodes (29a, 29b) change among a plurality of states in accordance with a movement of the operating member (20). A divisor of an integer N does not include 4, where the integer N is a total number of times that the electrical states (Q1, Q2) of the at least two fixed electrodes (29a, 29b) change when the operating member (20) moves from one to a next one of adjacent two click points of the plurality of click points (e.g., C1 to C4).

According to this aspect, the total number of times of change in the electrical states (Q1, Q2) of the at least two fixed electrodes (29a, 29b) between click points is not limited to a multiple of 4. This can offer a greater degree of flexibility in the setting of the total number of times of change in the electrical states (Q1, Q2) of the fixed electrodes (29a, 29b) when the operating member (20) moves from one click point to a next click points.

In the input device (2) of a second aspect, based on the first aspect, the total number of times that the electrical states (Q1, Q2) of the at least two fixed electrodes (29a, 29b) change when the operating member (20) moves from the one to the next one of the adjacent two click points is less than 4.

This aspect can reduce the total number of times of change in the electrical states (Q1, Q2) of the at least two fixed electrodes (29a, 29b) between the click points. Accordingly, the output signals (such as the output voltages) of the plurality of line electrodes (Y1) can be read out with a high scan speed and a reduced read error. This can improve the read-out responsiveness to the scan speed.

In the input device (2) of a third aspect, based on the second aspect, the total number of times that the electrical states (Q1, Q2) of the at least two fixed electrodes (29a, 29b) change when the operating member (20) moves from the one to the next one of the adjacent two click points is 1.

This aspect can further reduce the total number of times of change in the electrical states (Q1, Q2) of the at least two fixed electrodes (29a, 29b) between the click points. This can accordingly further improve the read-out responsiveness to the scan speed.

In the input device (2) of a fourth aspect, based on any one of the first to third aspects, the operating member (20) is rotatable with respect to the at least two fixed electrodes (29a, 29b).

This aspect enables applying the present disclosure to a configuration with the operating member (20) of rotary type.

The input device (2) of a fifth aspect, based on any one of the first to fourth aspects, includes a plurality of contactors (30a to 30d) and a movable electrode (27b). The plurality of contactors (30a to 30d) are connected to the at least two fixed electrodes (29a, 29b). The movable electrode (27b) is configured to move along with the operating member (20) so as to come into contact with the contactors (30a to 30d) or out of contact with the contactors (30a to 30d). Either one of the movable electrode (27b) or the contactors (30a to 30d) is made of metal, and the rest of them is made of non-metal having electric conductivity.

This aspect can prevent the welding of the movable electrode (27b) and the contactors (30a to 30d). It is therefore possible to omit the grease to be applied to contact points between the movable electrode (27b) and the contactors (30a to 30d).

In the input device (2) of a sixth aspect, based on any one of the first to fifth aspects, the at least two fixed electrodes overlap with mutually different ones of the specific fixed electrodes.

This aspect enables applying the present disclosure to a configuration where the at least two fixed electrodes overlap with mutually different ones of the fixed line electrodes.

In the input device (2) of a seventh aspect, based on any one of the first to sixth aspects, the at least two fixed electrodes include a fixed electrode that is connected to a push switch configured to be switched between an ON state and an OFF state in accordance with a movement of the operating member.

This aspect enables applying the present disclosure to a configuration where the at least two fixed electrodes include the fixed electrode that is connected to the push switch configured to be switched between an ON state and an OFF state in accordance with the movement of the operating member.

An input system of an eighth aspect includes the input device (2) of any one of the first to seventh aspects, the plurality of line electrodes (Y1), and a signal processor (315). The signal processor (315) is configured to perform signal processing on an output signal output from the plurality of line electrodes (Y1).

This aspect can provide the input system including the input device (2).

In the input system of a ninth aspect, based on the eighth aspect, the signal processor (315) is configured to perform correction (e.g., calibration) on an output signal output from a line electrode (Y1), other than the specific line electrodes (Y1), of the plurality of line electrodes (Y1), and perform no correction (e.g., no calibration) on an output signal output from the specific line electrodes (Y1).

This aspect can prevent the correction performed on the output signals of the line electrodes (Y1) from changing the relative relationship between the electrical states (Q1, Q2) of the at least two fixed electrodes (29a, 29b).

In the input system of a tenth aspect, based on the eighth aspect, the signal processor (315) is configured to perform mutually different correction on an output signal output from the specific line electrodes (Y1) and on an output signal output from a line electrode (Y1), other than the specific line electrodes (Y1), of the plurality of line electrodes (Y1).

According to this aspect, it is possible to perform respective optimal correction on the output signals of the specific line electrodes (Y1) and on the output signal of the line electrode (Y1), other than the specific line electrodes (Y1), of the plurality of line electrodes (Y1).

In the input system of an eleventh aspect, based on the tenth aspect, the signal processor (315) is configured to perform correction on the output signal output from the specific line electrodes (Y1). A relative relationship between the electrical states (Q1, Q2) of the at least two fixed electrodes (29a, 29b) is maintained before and after the correction.

According to this aspect, the relative relationship between the electrical states (Q1, Q2) of the at least two fixed electrodes (29a, 29b) can be maintained after the correction performed on the output signal of the specific line electrodes (Y1).

In the input system of a twelfth aspect, based on any one of the eighth to eleventh aspects, the signal processor (315) is configured to determine initial states of the electrical states (Q1, Q2) of the at least two fixed electrodes (29a, 29b) based on a relative relationship (e.g., magnitude relationship) between the electrical states (Q1, Q2) of the at least two fixed electrodes (29a, 29b), and detect a position of the operating member (20) based on the initial states.

According to this aspect, it is possible to detect the position of the operating member (20) even when the output signal of the specific line electrodes (Y1) can provide only the relative relationship between the electrical states (Q1, Q2) of the at least two fixed electrodes (29a, 29b).

In the input system of a thirteenth aspect, based on the twelfth aspect, the signal processor (315) is configured to, when finding the relative relationship being a certain relative relationship that the electrical states (Q1, Q2) of the at least two fixed electrodes (29a, 29b) are same as each other, determine the initial states based on change in the electrical states (Q1, Q2) of the at least two fixed electrodes (29a, 29b) when the operating member (20) moves from a position of the certain relative relationship.

According to this aspect, in a case where the relative relationship is the certain relative relationship that the electrical states (Q1, Q2) of the at least two fixed electrodes (29a, 29b) are same as each other, the position of the operating member (20) can be detected based on the change in the electrical states (Q1, Q2) of the at least two fixed electrodes (29a, 29b) when the operating member (20) moves from a position of this relative relationship.

In the input system of a fourteenth aspect, based on the twelfth aspect, the signal processor (315) is configured to, when finding the relative relationship being a certain relative relationship that the electrical states (Q1, Q2) of the at least two fixed electrodes (29a, 29b) are different from each other, determine the initial states based on the certain relative relationship.

According to this aspect, in a case where the relative relationship is the certain relative relationship that the electrical states (Q1, Q2) of the at least two fixed electrodes (29a, 29b) are different from each other, the initial states can be determined based on this certain relative relationship.

REFERENCE SIGNS LIST

1 Input System
2 Input Device
20 Operating Member
27b Movable Electrode
29a, 29b Fixed Electrode
30a to 30d Contactor
315 Detection Circuit (Signal Processor)
C1 to C4 Click Point
Y1 Second Line Electrode (Line Electrode)
Q1, Q2 Electrical State

The invention claimed is:
1. An input device, comprising:
at least two fixed electrodes configured to be placed to overlap with specific line electrodes of a plurality of line electrodes; and
an operating member movable with respect to the at least two fixed electrodes,
the operating member being movable within a movable range including a plurality of click points,
electrical states of the at least two fixed electrodes changing among a plurality of states in accordance with a movement of the operating member, and
a divisor of an integer N not including 4, where the integer N is a total number of times that the electrical states of the at least two fixed electrodes change when the operating member moves from one to a next one of adjacent two click points of the plurality of click points,
when a relative relationship between the electrical states of the at least two fixed electrodes is different from each other, a calibration is performed for the output signal of the specific line electrode so that the relative relationship of the at least two fixed electrodes is maintained.
2. The input device of claim 1, wherein the total number of times that the electrical states of the at least two fixed electrodes change when the operating member moves from the one to the next one of the adjacent two click points is less than 4.

3. The input device of claim 2, wherein the total number of times that the electrical states of the at least two fixed electrodes change when the operating member moves from the one to the next one of the adjacent two click points is 1.

4. The input device of claim 1, wherein the operating member is rotatable with respect to the at least two fixed electrodes.

5. The input device of claim 1, wherein the at least two fixed electrodes overlap with mutually different ones of the specific line electrodes.

6. The input device of claim 1, wherein the at least two fixed electrodes include a fixed electrode that is connected to a push switch configured to be switched between an ON state and an OFF state in accordance with a movement of the operating member.

7. An input system, comprising:
the input device of claim 1;
the plurality of line electrodes; and
a signal processor configured to perform signal processing on an output signal output from the plurality of line electrodes.

8. The input system of claim 7, wherein
the signal processor is configured to:
perform correction on an output signal output from a line electrode, other than the specific line electrodes, of the plurality of line electrodes, and
perform no correction on an output signal output from the specific line electrodes.

9. The input system of claim 7, wherein the signal processor is configured to perform mutually different correction on an output signal output from the specific line electrodes and on an output signal output from a line electrode, other than the specific line electrodes, of the plurality of line electrodes.

10. The input system of claim 9, wherein
the signal processor is configured to perform correction on the output signal output from the specific line electrodes, and
a relative relationship between the electrical states of the at least two fixed electrodes is maintained before and after the correction.

11. The input system of claim 7, wherein
the signal processor is configured to:
determine initial states of the electrical states of the at least two fixed electrodes based on a relative relationship between the electrical states of the at least two fixed electrodes, and
detect a position of the operating member based on the initial states.

12. The input system of claim 11, wherein the signal processor is configured to, when finding the relative relationship being a certain relative relationship that the electrical states of the at least two fixed electrodes are same as each other, determine the initial states based on change in the electrical states of the at least two fixed electrodes when the operating member moves from a position of the certain relative relationship.

13. The input system of claim 11, wherein the signal processor is configured to, when finding the relative relationship being a certain relative relationship that the electrical states of the at least two fixed electrodes are different from each other, determine the initial states based on the certain relative relationship.

14. An input device, comprising:
at least two fixed electrodes configured to be placed to overlap with specific line electrodes of a plurality of line electrodes;
an operating member movable with respect to the at least two fixed electrodes,
a plurality of contactors connected to the at least two fixed electrodes; and
a movable electrode configured to move along with the operating member so as to come into contact with the contactors or out of contact with the contactors,
the operating member being movable within a movable range including a plurality of click points,
electrical states of the at least two fixed electrodes changing among a plurality of states in accordance with a movement of the operating member, and
a divisor of an integer N not including 4, where the integer N is a total number of times that the electrical states of the at least two fixed electrodes change when the operating member moves from one to a next one of adjacent two click points of the plurality of click points, wherein
either one of the movable electrode or the contactors is made of metal, and the rest of the movable electrode or the contactors is made of non-metal having electric conductivity.

* * * * *